(12) United States Patent
Michiuchi et al.

(10) Patent No.: US 10,603,721 B2
(45) Date of Patent: Mar. 31, 2020

(54) HARD ALLOY AND CUTTING TOOL

(71) Applicant: Sumitomo Electric Industries, Ltd., Osaka-shi (JP)

(72) Inventors: Masato Michiuchi, Itami (JP); Keiichi Tsuda, Itami (JP); Yoshihiro Minato, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 241 days.

(21) Appl. No.: 15/552,629

(22) PCT Filed: Oct. 21, 2016

(86) PCT No.: PCT/JP2016/081308
§ 371 (c)(1),
(2) Date: Aug. 22, 2017

(87) PCT Pub. No.: WO2017/077884
PCT Pub. Date: May 11, 2017

(65) Prior Publication Data
US 2018/0036806 A1  Feb. 8, 2018

(30) Foreign Application Priority Data

Nov. 2, 2015  (JP) .................................. 2015-215726

(51) Int. Cl.
*C22C 29/04* (2006.01)
*B23B 27/14* (2006.01)
(Continued)

(52) U.S. Cl.
CPC .............. *B23B 27/148* (2013.01); *B22F 3/24* (2013.01); *C01B 21/0828* (2013.01);
(Continued)

(58) Field of Classification Search
USPC .................................... 75/236; 428/457, 469
See application file for complete search history.

(56) References Cited

U.S. PATENT DOCUMENTS

| 2009/0133534 | A1* | 5/2009 | Kang ..................... B82Y 30/00 75/236 |
| 2011/0117368 | A1 | 5/2011 | Matsubara et al. |
| 2014/0227053 | A1 | 8/2014 | Tokunaga et al. |

FOREIGN PATENT DOCUMENTS

| CN | 103282147 A | 9/2013 |
| DE | 19704242 | * 8/1998 |

(Continued)

*Primary Examiner* — Archene A Turner
(74) *Attorney, Agent, or Firm* — Baker Botts L.L.P.; Michael A. Sartori

(57) ABSTRACT

A hard alloy includes complex carbonitride hard phases that contain Ti and at least one additional element, and a metal binder phase containing an iron group element as a main component element. The complex carbonitride hard phases include homogeneous composition hard phases where in-complex carbonitride hard phase average concentrations of Ti and the additional element have a difference of greater than or equal to −5 atom % and less than or equal to 5 atom % from average concentrations of Ti and the additional element in all the complex carbonitride hard phases. On any cross section specified in the hard alloy, a cross-sectional area of the homogeneous composition hard phases accounts for greater than or equal to 80% of a cross-sectional area of the complex carbonitride hard phases, and the homogeneous composition hard phases account for greater than or equal to 80% of the complex carbonitride hard phases in number.

11 Claims, 8 Drawing Sheets

(51) Int. Cl.
  *C22C 1/05* (2006.01)
  *B22F 3/24* (2006.01)
  *C01B 21/082* (2006.01)
  *B22F 5/00* (2006.01)
  *C04B 35/58* (2006.01)

(52) U.S. Cl.
  CPC .............. *C22C 1/051* (2013.01); *C22C 29/04* (2013.01); *B22F 2005/001* (2013.01); *B22F 2998/10* (2013.01); *C01P 2004/03* (2013.01); *C04B 35/58021* (2013.01); *C04B 2235/5436* (2013.01)

(56) References Cited

FOREIGN PATENT DOCUMENTS

| | | |
|---|---|---|
| JP | H02-190438 A | 7/1990 |
| JP | 2004-292842 A | 10/2004 |
| JP | 2006-131975 A | 5/2006 |
| WO | 2010/008004 A1 | 1/2010 |

* cited by examiner

HARD ALLOY AND CUTTING TOOL

TECHNICAL FIELD

The present invention relates to a hard alloy and a cutting tool. The present application claims priority based on Japanese Patent Application No. 2015-215726 filed on Nov. 2, 2015 and all the contents described in the Japanese application is incorporated herein by reference.

BACKGROUND ART

A cermet that is a hard alloy containing Ti as a main component element is excellent in wear resistance and therefore has been suitably used for, for example, cutting tools and wear resistance tools.

Japanese Patent Laying-Open No. 02-190438 (PTD 1) discloses a cermet for tools that includes 70 to 95 vol % of a hard dispersed phase and 5 to 30 vol % of a binder phase containing at least one iron group metal and that includes, as a composition structure, single phase particles, i.e., I particles, and II particles having a core portion and a peripheral portion.

Japanese Patent Laying-Open No. 2004-292842 (PTD 2) discloses a cermet that includes a hard phase and a binder phase, the hard phase including a first hard phase that has a core portion of titanium carbonitride and a peripheral portion of a complex carbonitride solid solution of at least one metal other than titanium and titanium, and a second hard phase containing a complex carbonitride solid solution of at least one metal other than titanium and titanium.

Japanese Patent Laying-Open No. 2006-131975 (PTD 3) discloses a cermet for saw blades that includes a binder phase containing iron group metals, mainly Co and Ni and a hard phase mainly containing a carbonitride of essential Ti and W and at least one other metal component, the hard phase having a core structure that includes a black core particle and a peripheral component.

WO 2010/008004 A (PTD 4) discloses a hard powder containing greater than or equal to 90 vol % of a complex carbonitride solid solution represented by $(Ti_{1-x},M_x)(C_{1-y},N_y)$, a method of manufacturing the hard powder, and a sintered hard alloy consisting of a hard phase that contains the complex carbonitride solid solution represented by $(Ti_{1-x},M_x)(C_{1-y},N_y)$ in an amount of greater than or equal to 90 vol % of the whole hard phase, and a binder phase.

CITATION LIST

Patent Document

PTD 1: Japanese Patent Laying-Open No. 02-190438
PTD 2: Japanese Patent Laying-Open No. 2004-292842
PTD 3: Japanese Patent Laying-Open No. 2006-131975
PTD 4: WO 2010/008004 A

SUMMARY OF INVENTION

A hard alloy according to the present disclosure includes a plurality of complex carbonitride hard phases that contain titanium as a main component element and at least one additional element selected from the group consisting of zirconium, hafnium, vanadium, niobium, tantalum, chromium, molybdenum, tungsten, aluminum, and silicon, and a metal binder phase containing an iron group element as a main component element. The plurality of complex carbonitride hard phases include a plurality of homogeneous composition hard phases where in-complex carbonitride hard phase average concentrations of titanium and the additional element have a difference in the range of greater than or equal to −5 atom % and less than or equal to 5 atom % from average concentrations of titanium and the additional element in all the complex carbonitride hard phases. On any cross section specified in the hard alloy, a cross-sectional area of the homogeneous composition hard phases accounts for greater than or equal to 80% of a cross-sectional area of the complex carbonitride hard phases, and the homogeneous composition hard phases account for greater than or equal to 80% of the complex carbonitride hard phases in number.

A cutting tool according to the present disclosure includes a base material formed of the hard alloy described above.

MODE FOR CARRYING OUT INVENTION

Solutions to Problems

Figure 1:
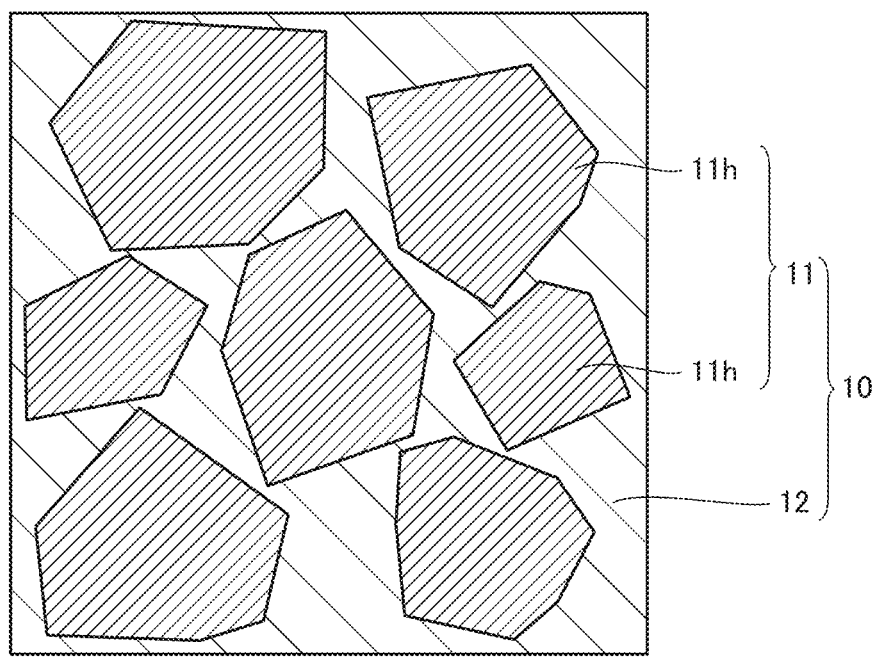
FIG. 1 is a schematic view illustrating one example of a cross-sectional structure of a hard alloy according to an aspect of the present invention.

All the cermets disclosed in Japanese Patent Laying-Open No. 02-190438 (PTD 1), Japanese Patent Laying-Open No. 2004-292842 (PTD 2), and Japanese Patent Laying-Open No. 2006-131975 (PTD 3) include a hard phase having a core structure that includes a core portion and a peripheral portion surrounding the core portion, resulting in different types of composition in the core portion and the peripheral portion, so that there has been a problem that it is difficult to increase the strength and the fracture toughness of the cermets.

WO 2010/0080004 A (PTD 4) describes that a complex carbonitride solid solution contained in a hard powder has uniform composition where metal elements contained in the complex carbonitride solid solution are each in the range of less than or equal to plus/minus 5 atom % from the average composition of each of the metal elements. The present inventors, however, have found through additional study that such a hard powder includes a carbonitride containing Ti as at least a part of a raw material, and such a carbonitride containing Ti is very chemically stable and is therefore unlikely to be integrated with another raw material even when subjected to a heat treatment at a high temperature of 2200° C., providing a large amount of residual unreacted carbonitrides containing Ti that act as a nucleus of dissolution and reprecipitation during sintering, to end up forming a hard phase having a core structure. That is, WO 2010/0080004 A (PTD 4) has also had a problem that it is difficult to increase the strength and the fracture toughness of a sintered hard alloy obtained from the hard powder disclosed in the patent document.

Therefore, an object of the present invention is to solve the problems described above and provide a hard alloy that includes a complex carbonitride hard phase having homogeneous composition and that is high in hardness and fracture toughness and provide a cutting tool high in wear resistance and chipping resistance.

Advantageous Effects of Disclosure

According to the present disclosure, it is possible to provide a hard alloy that includes a complex carbonitride hard phase having homogeneous composition and that is high in hardness and fracture toughness and provide a cutting tool high in wear resistance and chipping resistance

DESCRIPTION OF EMBODIMENTS OF INVENTION

[1] A hard alloy according to an embodiment of the present invention includes a plurality of complex carbonitride hard phases that contain titanium as a main component element and at least one additional element selected from the group consisting of zirconium, hafnium, vanadium, niobium, tantalum, chromium, molybdenum, tungsten, aluminum, and silicon, and a metal binder phase containing an iron group element as a main component element. The plurality of complex carbonitride hard phases include a plurality of homogeneous composition hard phases where in-complex carbonitride hard phase average concentrations of titanium and the additional element have a difference in a range of greater than or equal to −5 atom % and less than or equal to 5 atom % from average concentrations of titanium and the additional element in all the complex carbonitride hard phases. On any cross section specified in the hard alloy, a cross-sectional area of the homogeneous composition hard phases accounts for greater than or equal to 80% of a cross-sectional area of the complex carbonitride hard phases, and the homogeneous composition hard phases account for greater than or equal to 80% of the complex carbonitride hard phases in number. Many of the complex carbonitride hard phases included in the hard alloy according to the present embodiment are homogeneous composition hard phases that are uniform and have little variation in composition of titanium and the additional element with respect to all the complex carbonitride hard phases, so that the hard alloy is high in both hardness and fracture toughness.

[2] In the homogeneous composition hard phases of the hard alloy according to the present embodiment, concentration distributions of titanium and the additional element in each of the homogeneous composition hard phases can be set to a range of greater than or equal to −5 atom % and less than or equal to 5 atom % from the average concentrations of titanium and the additional element in all the complex carbonitride hard phases. Such a hard alloy has small concentration distributions of titanium and the additional element in each of the homogeneous composition hard phases, that is, the composition of titanium and the additional element in each of the homogeneous composition hard phases is uniform and has little variation, so that both the hardness and the fracture toughness are high.

[3] On a cross section specified in the hard alloy according to the present embodiment, the cross-sectional area of the complex carbonitride hard phases can be set to greater than or equal to 80% and less than or equal to 97% of a cross-sectional area of the hard alloy. Such a hard alloy has a suitable cross-sectional area ratio between the complex carbonitride hard phases and the metal binder phase, so that both the hardness and the fracture toughness are high.

[4] On the cross section specified in the hard alloy according to the present embodiment, a crystal particle size $D_{50}$ of the complex carbonitride hard phases at 50% in a number-based cumulative particle size distribution can be set to greater than or equal to 0.5 μm and less than or equal to 3.0 μm. Such a hard alloy is high in both hardness and fracture toughness, so that it is particularly suitably used for a cutting tool.

[5] On the cross section specified in the hard alloy according to the present embodiment, a ratio $D_{10}/D_{90}$ of a crystal particle size $D_{10}$ to a crystal particle size $D_{90}$ of the complex carbonitride hard phases at 10% and 90% in a number-based cumulative particle size distribution can be set to greater than or equal to 0.25. Such a hard alloy has a sharp particle size distribution of the complex carbonitride hard phases, resulting in reduction of a coarse structure that can be an origin of fracture, so that chipping resistance is particularly high.

[6] In the hard alloy according to the present embodiment, a content of an iron group element except cobalt in the metal binder phase can be set to less than 1 vol %. Such a hard alloy contains cobalt as a main component of the metal binder phase, so that both the hardness and the fracture toughness are high due to the characteristics of cobalt itself.

[7] The hard alloy according to the present embodiment includes a plurality of complex carbonitride hard phases that contain titanium as a main component element and at least one additional element selected from the group consisting of zirconium, hafnium, vanadium, niobium, tantalum, chromium, molybdenum, tungsten, aluminum, and silicon, and a metal binder phase containing an iron group element as a main component element; the plurality of complex carbonitride hard phases includes a plurality of homogeneous composition hard phases where in-complex carbonitride hard phase average concentrations of titanium and the additional element have a difference in a range of greater than or equal to −5 atom % and less than or equal to 5 atom % from average concentrations of titanium and the additional element in all the complex carbonitride hard phases; in the homogeneous composition hard phases, concentration distributions of titanium and the additional element in each of the homogeneous composition hard phases are set to a range of greater than or equal to −5 atom % and less than or equal to 5 atom % from the average concentrations of titanium and the additional element in all the complex carbonitride hard phases; on any specified cross section, a cross-sectional area of the homogeneous composition hard phases accounts for greater than or equal to 80% of a cross-sectional area of the complex carbonitride hard phases, the homogeneous composition hard phases account for greater than or equal to 80% of the complex carbonitride hard phases in number, the cross-sectional area of the complex carbonitride hard phases is set to greater than or equal to 80% and less than or equal to 97% of a cross-sectional area of the hard alloy, a crystal particle size $D_{50}$ of the complex carbonitride hard phases at 50% in a number-based cumulative particle size distribution is set to greater than or equal to 0.5 μm and less than or equal to 3.0, and a ratio $D_{10}/D_{90}$ of a crystal particle size $D_{10}$ to a crystal particle size $D_{90}$ of the complex carbonitride hard phases at 10% and 90% in a number-based cumulative particle size distribution can be set to greater than or equal to 0.25; and a content of an iron group element except cobalt in the metal binder phase can be set to less than 1 vol %. Such a hard alloy is high in both hardness and fracture toughness, so that it is particularly suitably used for a cutting tool.

[8] A cutting tool according to another embodiment of the present invention includes a base material formed of the hard alloy according to the embodiments described above. The cutting tool according to the present embodiment includes the base material formed of the hard alloy high in both hardness and fracture toughness, so that both the wear resistance and the chipping resistance are high.

[9] The cutting tool according to the present embodiment can further include a hard film that is formed on at least a part of a surface of the base material. Such a cutting tool further includes the hard film, so that both the wear resistance and the chipping resistance are high.

[10] A cutting tool according to the present embodiment can include a base material formed of the hard alloy according to the embodiments described above, and a hard film that is formed on at least a part of a surface of the base material by physical vapor deposition. Such a cutting tool includes the hard film formed on at least a part of the surface of the hard alloy by physical vapor deposition, so that both the wear resistance and the chipping resistance are high.

[11] A cutting tool according to the present embodiment can include a base material formed of, among the hard alloys according to the embodiments described above, the hard alloy where the content of an iron group element except cobalt in the metal binder phase is less than 1 mass %, and a hard film formed on at least a part of a surface of the base material by chemical vapor deposition. In such a cutting tool, the hard film can be formed on at least a part of a surface of the base material by chemical vapor deposition without forming a harmful phase, both the wear resistance and the chipping resistance are high, and a thermal expansion coefficient of the base material is approximate to that of the hard film to suppress the generation of thermal cracking after formation of the film.

DETAIL OF EMBODIMENTS OF INVENTION

Embodiment 1: Hard Alloy

{Hard Alloy}
As illustrated in FIG. 1, a hard alloy 10 according to Embodiment 1 includes a plurality of complex carbonitride hard phases 11 that contain titanium (Ti) as a main component element and at least one additional element selected from the group consisting of zirconium (Zr), hafnium (Hf), vanadium (V), niobium (Nb), tantalum (Ta), chromium (Cr), molybdenum (Mo), tungsten (W), aluminum (Al), and silicon (Si), and a metal binder phase 12 containing an iron group element as a main component element. The plurality of complex carbonitride hard phases 11 include a plurality of homogeneous composition hard phases 11h where in-complex carbonitride hard phase average concentrations of Ti and the additional element have a difference in the range of greater than or equal to −5 atom % and less than or equal to 5 atom % from average concentrations of Ti and the additional element in all complex carbonitride hard phases 11. On any cross section specified in hard alloy 10, a cross-sectional area of homogeneous composition hard phases 11h accounts for greater than or equal to 80% of a cross-sectional area of complex carbonitride hard phases 11, and homogeneous composition hard phases 11h account for greater than or equal to 80% of complex carbonitride hard phases 11 in number. Many of complex carbonitride hard phases 11 included in hard alloy 10 according to the present embodiment are homogeneous composition hard phases 11h that are uniform and have little variation in composition of Ti and the additional element in the phases, so that the hard alloy is high in both hardness and fracture toughness. Concentration distributions of carbon (C) and nitrogen (N) in complex carbonitride hard phases 11 are not particularly limited.

Ti contained in complex carbonitride hard phases 11 is a main component element, and the average concentration of Ti is greater than 50 atom % relative to the total of Ti and the additional element. Further, the average concentration of Ti is preferably greater than or equal to 60 atom % and less than or equal to 95 atom %, more preferably greater than or equal to 75 atom % and less than or equal to 90 atom %, from the viewpoint that the addition amount of the additional element is set to less than or equal to a solid solubility limit and an effect of the additional element is sufficiently drawn.

The additional element contained in complex carbonitride hard phases 11 is at least one element selected from the group consisting of Zr, Hf, V, Nb, Ta, Cr, Mo, W, Al, and Si, the average concentration of the additional element is less than 50 atom % relative to the total of Ti and the additional element. Further, the average concentration of the additional element is preferably greater than or equal to 5 atom % and less than or equal to 40 atom %, more preferably greater than or equal to 10 atom % and less than or equal to 25 atom %, from the viewpoint that an effect of the additional element is sufficiently drawn and the addition amount of the additional element is set to less than or equal to a solid solubility limit.

Metal binder phase 12 contains the iron group element as a main component element and, in addition to the iron group element, an inevitable element mixed from the complex carbonitride hard phases (i.e., at least a part of the additional element) and a slight amount of an impurity element. The average concentration of the iron group element is preferably greater than or equal to 90 atom %, more preferably greater than or equal to 95 atom %, from the viewpoint that the iron group element keeps a state of a metal and formation of a brittle intermediate compound is avoided. Here, the iron group element refers to the elements of Groups 8, 9, and 10 in Period 4, i.e., iron (Fe), cobalt (Co), and nickel (Ni). Examples of the element other than the iron group element contained in metal binder phase 12 include titanium (Ti) and tungsten (W).

Here, the identification of types of Ti and the additional element in complex carbonitride hard phases 11 and the iron group element and a metal element other than the iron group element in metal binder phase 12 and the measurement of the average concentrations of these elements are performed for a wrapped cut surface obtained by cutting hard alloy 10 along any specified surface and wrapping the cut surface, by SEM (scanning electron microscope)/EDX (energy dispersive X-ray spectroscopy) and/or EPMA (electron probe microanalyzer). In an SEM composition image of a cut surface of hard alloy 10, a complex carbonitride hard phase 11 having clear contrast in the phase is understood not to be a homogeneous composition hard phase without the analyses described above.

The plurality of complex carbonitride hard phases 11 contain Ti and the additional element. The plurality of complex carbonitride hard phases 11 include the plurality of homogeneous composition hard phases 11$h$ where in-complex carbonitride hard phase 11 average concentrations $C\beta_{Ti}$ and $C\beta_A$ (atom %) of Ti and the additional element have differences $C\beta_{Ti}-C\beta_{Ti0}$ and $C\beta_A-C\beta_{A0}$ (atom %) in the range of greater than or equal to −5 atom % and less than or equal to 5 atom % from average concentrations $C\beta_{Ti0}$ and $C\beta_{A0}$ (atom %) of Ti and the additional element in all the plurality of complex carbonitride hard phases 11, from the viewpoint that the composition of Ti and the additional element is made uniform and small in variation (specifically to homogenize the composition) in complex carbonitride hard phases 11. From the viewpoint as described above, at least one of the differences $C\beta_{Ti}-C\beta_{Ti0}$ and $C\beta_A-C\beta_{A0}$ is preferably greater than or equal to −3 atom % and less than or equal to 3 atom %.

On any cross section specified in hard alloy 10, the cross-sectional area of homogeneous composition hard phases 11$h$ accounts for greater than or equal to 80% of the cross-sectional area of complex carbonitride hard phases 11, and homogeneous composition hard phases 11$h$ account for greater than or equal to 80% of complex carbonitride hard phases 11 in number, from the viewpoint that the composition of Ti and the additional element of complex carbonitride hard phases 11 is made uniform and small in variation (specifically to homogenize the composition) in complex carbonitride hard phases 11. From the viewpoint as described above, the cross-sectional area of homogeneous composition hard phases 11$h$ accounts for preferably greater than or equal to 85%, more preferably greater than or equal to 90% of the cross-sectional area of complex carbonitride hard phases 11. In addition, homogeneous composition hard phases 11$h$ account for preferably greater than or equal to 85%, more preferably greater than or equal to 90% of complex carbonitride hard phases 11 in number.

In homogeneous composition hard phases 11$h$ of hard alloy 10 according to the present embodiment, concentration distributions of titanium and the additional element in each of homogeneous composition hard phases 11$h$ are preferably in the range of greater than or equal to −5 atom % and less than or equal to 5 atom %, more preferably greater than or equal to −3 atom % and less than or equal to 3 atom % from the average concentrations of titanium and the additional element in all complex carbonitride hard phases 11. Such hard alloy 10 has small concentration distributions of titanium and the additional element in each of homogeneous composition hard phases 11$h$, that is, the composition of titanium and the additional element in each of homogeneous composition hard phases 11$h$ is uniform and has little variation, so that both the hardness and the fracture toughness are high.

Here, as for homogeneous composition hard phases 11$h$, the phrase "a concentration distribution of titanium in each of homogeneous composition hard phases 11$h$ is in the range of greater than or equal to −5 atom % and less than or equal to 5 atom % or in the range of greater than or equal to −3 atom % and less than or equal to 3 atom % from the average concentration of titanium in all complex carbonitride hard phases 11" refers to that, as for a minimum concentration $C\beta_{Ti-min}$ (atom %) and a maximum concentration $C\beta_{Ti-Max}$ (atom %) of titanium in each of homogeneous composition hard phases 11$h$ and an average concentration $C\beta_{Ti0}$ (atom %) of titanium in all complex carbonitride hard phases 11, $C\beta_{Ti-min}-C\beta_{Ti0}$ is greater than or equal to −5 atom % and $C\beta_{Ti-Max}-C\beta_{Ti0}$ is less than or equal to 5 atom %, or $C\beta_{Ti-Min}-C\beta_{Ti0}$ is greater than or equal to −3 atom % and $C\beta_{Ti-Max}-C\beta_{Ti0}$ is less than or equal to 3 atom %.

Here, as for homogeneous composition hard phases 11$h$, the phrase "a concentration distribution of the additional element in each of homogeneous composition hard phases 11$h$ is in the range of greater than or equal to −5 atom % and less than or equal to 5 atom % or in the range of greater than or equal to −3 atom % and less than or equal to 3 atom % from the average concentration of the additional element in all complex carbonitride hard phases 11" refers to that, as for a minimum concentration $C\beta_{A-Min}$ (atom %) and a maximum concentration $C\beta_{A-Max}$ (atom %) of the additional element in each of homogeneous composition hard phases 11$h$ and an average concentration $C\beta_{A0}$ (atom %) of the additional element in all complex carbonitride hard phases 11, $C\beta_{A-min}-C\beta_{A0}$ is greater than or equal to −5 atom % and $C\beta_{A-Max}-C\beta_{A0}$ is less than or equal to 5 atom %, or $C\beta_{A-min}-C\beta_{A0}$ is greater than or equal to −3 atom % and $C\beta_{A-Max}-C\beta_{A0}$ is less than or equal to 3 atom %.

On the cross section specified in hard alloy 10 according to the present embodiment, the cross-sectional area of complex carbonitride hard phases 11 accounts for preferably greater than or equal to 80% and less than or equal to 97%, more preferably greater than or equal to 84% and less than or equal to 92% of a cross-sectional area of hard alloy 10, from the viewpoint of hard alloy 10 high in both hardness and fracture toughness. That is, a cross-sectional area of the metal binder phase accounts for preferably greater than or equal to 3% and less than or equal to 20%, more preferably greater than or equal to 8% and less than or equal to 16% of the sectional area of hard alloy 10.

On the cross section specified in hard alloy 10 according to the present embodiment, a crystal particle size $D_{50}$ of complex carbonitride hard phases 11 at 50% in a number-based cumulative particle size distribution is preferably greater than or equal to 0.5 μm and less than or equal to 3.0 μm, more preferably greater than or equal to 0.6 μm and less than or equal to 2.0 μm, from the viewpoint of hard alloy 10 high in both hardness and high fracture toughness.

On the cross section specified in hard alloy 10 according to the present embodiment, a ratio $D_{10}/D_{90}$ of a crystal particle size $D_{10}$ to a crystal particle size $D_{90}$ of complex carbonitride hard phases 11 at 10% and 90% in a number-based cumulative particle size distribution is preferably greater than or equal to 0.25, more preferably greater than or equal to 0.30, from the viewpoint of complex carbonitride hard phases 11 having a sharp particle size distribution and the hard alloy particularly high in chipping resistance.

In hard alloy 10 according to the present embodiment, a content of an iron group element except Co in the metal binder phase is preferably less than 1 vol %, more preferably less than 0.5 vol %, from the viewpoint that hard alloy 10 is high in both hardness and fracture toughness due to the characteristics of Co itself when the main component of the metal binder phase is Co.

That is, hard alloy 10 according to the present embodiment includes a plurality of complex carbonitride hard phases 11 that contain Ti as a main component element and at least one additional element selected from the group consisting of Zr, Hf, V, Nb, Ta, Cr, Mo, W, Al, and Si, and a metal binder phase 12 containing an iron group element as a main component element; the plurality of complex carbonitride hard phases 11 include a plurality of homogeneous composition hard phases 11h where in-complex carbonitride hard phase 11 average concentrations of Ti and the additional element have a difference in the range of greater than or equal to −5 atom % and less than or equal to 5 atom % from average concentrations of Ti and the additional element in all complex carbonitride hard phases 11; in homogeneous composition hard phases 11h, concentration distributions of Ti and the additional element in each of homogeneous composition hard phases 11h are set to a range of greater than or equal to −5 atom % and less than or equal to 5 atom % from the average concentrations of Ti and the additional element in all complex carbonitride hard phases 11; on any specified cross section, a cross-sectional area of homogeneous composition hard phases 11h accounts for greater than or equal to 80% of a cross-sectional area of complex carbonitride hard phases 11, homogeneous composition hard phases 11h account for greater than or equal to 80% of complex carbonitride hard phases 11 in number, the cross-sectional area of complex carbonitride hard phases 11 is set to greater than or equal to 80% and less than or equal to 97% of a cross-sectional area of hard alloy 10, a crystal particle size $D_{50}$ of complex carbonitride hard phases 11 at 50% in a number-based cumulative particle size distribution is set to greater than or equal to 0.5 μm and less than or equal to 3.0, and a ratio $D_{10}/D_{90}$ of a crystal particle size $D_{10}$ to a crystal particle size $D_{90}$ of complex carbonitride hard phases 11 at 10% and 90% in a number-based cumulative particle size distribution can be set to greater than or equal to 0.25; and a content of an iron group element except Co in metal binder phase 12 can be set to less than 1 vol %. Such a hard alloy is high in both hardness and fracture toughness, so that it is particularly suitably used for a cutting tool.

{Method of Manufacturing Hard Alloy}

Figure 3:
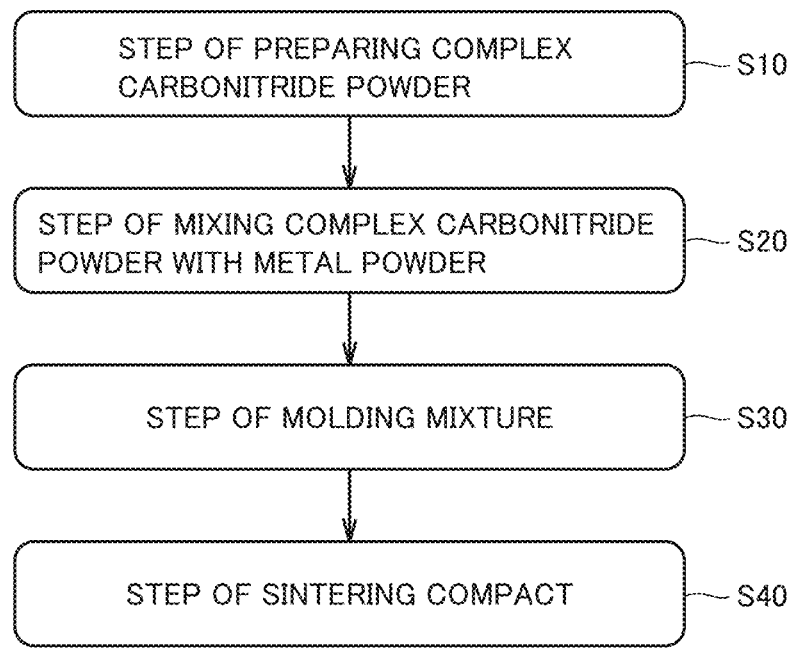
FIG. 3 is a flow chart illustrating one example of a method of manufacturing a hard alloy according to an aspect of the present invention.
Figure 4:
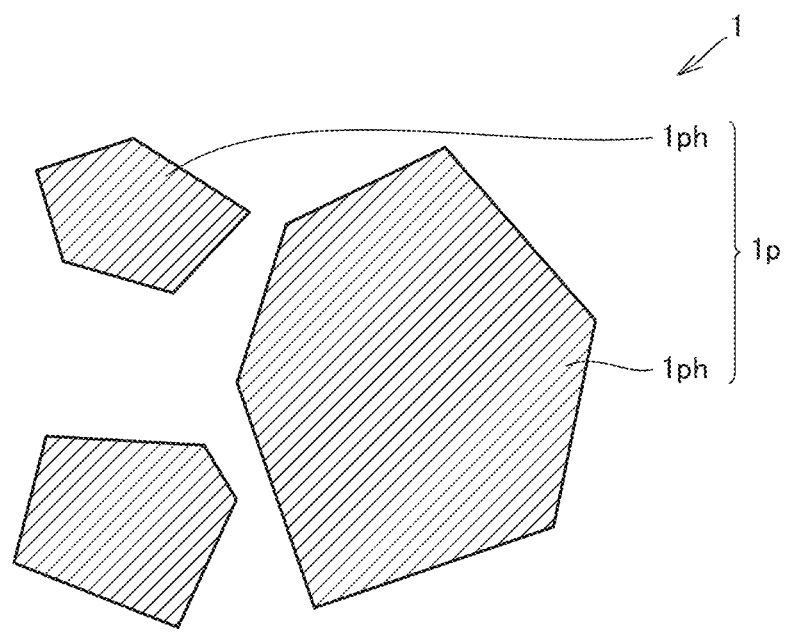
FIG. 4 is a schematic view illustrating one example of a cross-sectional structure of a complex carbonitride powder used for manufacturing a hard alloy according to an aspect of the present invention.

A method of manufacturing hard alloy 10 according to the present embodiment is not particularly limited; however, the method is preferably a powder metallurgy technique including step S10 of preparing a complex carbonitride powder, step S20 of mixing the complex carbonitride powder with a metal powder, step S30 of molding the mixture, and step S40 of sintering the molded product as illustrated in FIGS. 1, 3, and 4, from the viewpoint that hard alloy 10 is efficiently manufactured that includes complex carbonitride hard phases 11 including many homogeneous composition hard phases 11h uniform and having little variation in composition of Ti and the additional element in the phases, and that is high in hardness and fracture toughness.

(Step of Preparing Complex Carbonitride Powder)

Figure 5:
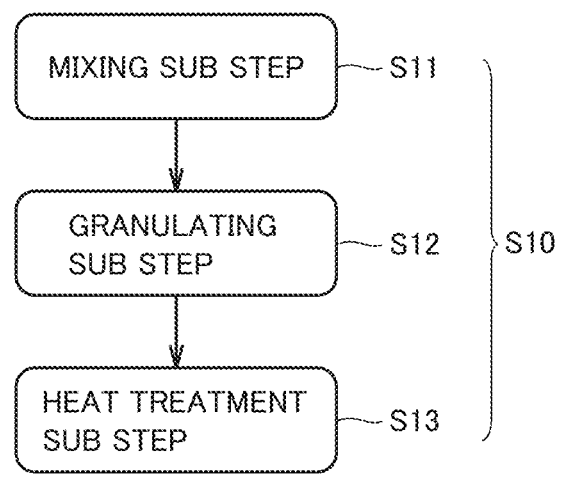
FIG. 5 is a flow chart illustrating one example of a step of preparing a complex carbonitride powder used for manufacturing a hard alloy according to an aspect of the present invention.

As illustrated in FIGS. 3 to 5, a complex carbonitride powder 1 prepared in step S10 of preparing a complex carbonitride powder is not particularly limited; however, the complex carbonitride powder preferably contains Ti as a main component element and at least one additional element selected from the group consisting of Zr, Hf, V, Nb, Ta, Cr, Mo, W, Al, and Si, from the viewpoint of efficiently manufacturing hard alloy 10 according to the present embodiment. Complex carbonitride powder 1 preferably includes a plurality of complex carbonitride particles 1p containing Ti and the additional element. The plurality of complex carbonitride particles 1p preferably include a plurality of homogeneous composition particles 1ph where in-complex carbonitride particle 1p average concentrations of Ti and the additional element have a difference in the range of greater than or equal to −5 atom % and less than or equal to 5 atom % from average concentrations of Ti and the additional element in whole complex carbonitride powder. On any cross section specified in complex carbonitride powder 1 fixed with a binder, a cross-sectional area of homogeneous composition particles 1ph preferably accounts for greater than or equal to 90% of a cross-sectional area of complex carbonitride particles 1p, and homogeneous composition particles 1ph preferably account for greater than or equal to 90% of complex carbonitride particles 1p in number.

Ti contained in complex carbonitride powder 1 is a main component element, and the average concentration of Ti is greater than 50 atom % relative to the total of Ti and the additional element. Further, the average concentration of Ti is preferably greater than or equal to 60 atom % and less than or equal to 95 atom %, more preferably greater than or equal to 75 atom % and less than or equal to 90 atom %, from the viewpoint that the addition amount of the additional element is set to less than or equal to a solid solubility limit and an effect of the additional element is sufficiently drawn.

The additional element contained in complex carbonitride powder 1 is at least one element selected from the group consisting of Zr, Hf, V, Nb, Ta, Cr, Mo, W, Al, and Si, and the average concentration of the additional element is less than 50 atom % relative to the total of Ti and the additional element. The average concentration of the additional element is preferably greater than or equal to 5 atom % and less than or equal to 40 atom %, more preferably greater than or equal to 10 atom % and less than or equal to 25 atom %, from the viewpoint that an effect of the additional element is sufficiently drawn and the addition amount of the additional element is set to less than or equal to a solid solubility limit.

Here, the identification of Ti and a type of the additional element in complex carbonitride powder 1 and complex carbonitride particles 1p and the measurement of the average concentrations of these elements are performed for a wrapped cut surface obtained by cutting a product, which is obtained through embedding of complex carbonitride powder 1 in a binder, along any specified surface together with the binder and wrapping the cut surface (that is, any cross section specified in complex carbonitride powder 1 fixed with a binder), by SEM (scanning electron microscope)/EDX (energy dispersive X-ray spectrometry) and/or EPMA (electron probe microanalyzer). Suitable examples of the binder for embedding complex carbonitride powder 1 therein include an epoxy resin, a polyester resin, a phenol resin, and an acrylic resin. In an SEM composition image of a cut surface of complex carbonitride powder 1, a complex carbonitride particle 1p having clear contrast in the particle is understood not to be a homogeneous composition particle without the analyses described above.

Complex carbonitride particles 1p included in complex carbonitride powder 1 contain Ti and the additional element. Complex carbonitride particles 1p include a plurality of homogeneous composition particles 1ph where in-complex carbonitride particle 1p average concentrations $C\alpha_{Ti}$ and $C\alpha_A$ (atom %) of Ti and the additional element have differences $C\alpha_{Ti}-C\alpha_{TiO}$ and $C\alpha_A-C\alpha_{AO}$ (atom %) in the range of greater than or equal to −5 atom % and less than or equal to 5 atom % from average concentrations $C\alpha_{TiO}$ and $C\alpha_{AO}$ (atom %) of Ti and the additional element in whole complex carbonitride powder 1, from the viewpoint that the composition of Ti and the additional element is made uniform and small in variation (specifically to homogenize the composition) in complex carbonitride particles 1p. From the viewpoint as described above, at least one of the differences $C\alpha_{Ti}-C\alpha_{TiO}$ and $C\alpha_A-C\alpha_{AO}$ is preferably greater than or equal to −3 atom % and less than or equal to 3 atom %.

On any cross section specified in complex carbonitride powder 1 fixed with a binder, the cross-sectional area of homogeneous composition particles 1ph accounts for greater than or equal to 90% of the cross-sectional area of complex carbonitride particles 1p, and homogeneous composition particles 1ph account for greater than or equal to 90% of complex carbonitride particles 1p in number, from the viewpoint that the composition of Ti and the additional element is made uniform and small in variation (specifically to homogenize the composition) in complex carbonitride powder 1. From the viewpoint as described above, the cross-sectional area of homogeneous composition particles 1ph accounts for preferably greater than or equal to 92%, more preferably greater than or equal to 94% of the cross-sectional area of complex carbonitride particles 1p. In addition, homogeneous composition particles 1ph account for preferably greater than or equal to 92%, more preferably greater than or equal to 94% of complex carbonitride particles 1p in number.

A crystal particle size $D_{50}$ of complex carbonitride particles 1p at 50% in a number-based cumulative particle size distribution is preferably greater than or equal to 0.3 μm and less than or equal to 5.0 μm, from the viewpoint that the volume of the powder is reduced for easy handling and excessive pulverization of the powder that is used as a raw material powder of the hard alloy is made unnecessary, and further, the crystal particle size $D_{50}$ is more preferably greater than or equal to 0.5 μm and less than or equal to 3.0 μm, from the viewpoint of improving both the hardness and the fracture toughness of a cutting tool. Here, the crystal particle size $D_{50}$ of complex carbonitride particles 1p at 50% in a number-based cumulative particle size distribution is calculated from a volume-based cumulative particle size distribution of particles measured by a laser diffraction particle size distribution analyzer.

As illustrated in FIGS. 3 to 5, step S10 of preparing a complex carbonitride powder includes a mixing sub step S11 of mixing a Ti-containing oxide powder, an oxide powder containing at least one additional element selected from the group consisting of Zr, Hf, V, Nb, Ta, Cr, Mo, W, Al, and Si, and a carbon (C)-containing carbon source powder to form a mixed powder; a granulating sub step S12 of granulating the mixed powder to form granules; and a heat treatment sub step S13 of subjecting the granules to a heat treatment at a temperature of greater than or equal to 1800° C. in a nitrogen gas-containing nitrogen atmosphere gas to form complex carbonitride powder 1, from the viewpoint of efficiently manufacturing complex carbonitride powder 1 that includes complex carbonitride particles 1p including homogeneous composition particles 1ph homogeneous in composition in the particles.

In the method of manufacturing complex carbonitride powder 1 according to the present embodiment, the Ti-containing oxide powder, the additional element-containing oxide powder, and the C-containing carbon source powder are used as starting raw materials to substantially simultaneously and continuously cause, in heat treatment sub step S13, a reduction reaction of the oxide powders, a solid solution reaction resulting from mutual dispersion between active Ti and additional element of the reduced oxide powders, and a carbonitriding reaction of the powders that have been made into a solid solution, in particular, to remarkably promote the solid solution reaction by retention of the active Ti and additional element immediately after reduction, so that complex carbonitride powder 1 according to Embodiment 1 can be obtained that includes complex carbonitride particles 1p including homogeneous composition particles 1ph homogeneous in composition in the particles.

The Ti-containing oxide used as a starting raw material in mixing sub step S11 is not particularly limited, and examples of the Ti-containing oxide include $TiO_2$. A crystal structure of $TiO_2$ is not particularly limited and may be any of a rutile type, an anatase type, and a brookite type. The additional element-containing oxide is not particularly limited, and examples thereof include oxide powders of Zr, Hf, V, Nb, Ta, Cr, Mo, W, Al, and Si, namely, $ZrO_2$, $HfO_2$, $V_2O_5$, $Nb_2O_5$, $Ta_2O_5$, $Cr_2O_3$, $MoO_3$, $WO_3$, $Al_2O_3$, and $SiO_2$, respectively. Here, the oxidation number of each element and a content of impurities can be changed as long as the change is not against the object. The C-containing carbon source is not particularly limited, and graphite and polysaccharides can be also used, for example.

Here, at least a part of the Ti-containing oxide and the additional element-containing oxide is preferably a complex oxide containing Ti and the additional element. Thus, the composition in complex carbonitride particles 1p can be homogenized while the powder particle size of complex carbonitride particles 1p in complex carbonitride powder 1 is kept small at 50% in a number-based cumulative particle size distribution. The complex oxide containing Ti and the additional element is not particularly limited, and examples of the complex oxide include $Ti_{0.9}Zr_{0.1}O_2$ and $Ti_{0.9}W_{0.1}O_2$.

The mixing method in mixing sub step S11 is not particularly limited; however, suitable examples of the mixing method include mixing by a dry ball mill and mixing by a wet ball mill that have a high pulverization action, from the viewpoint of reducing the powder particle size of the mixed powder (referring to the powder obtained through mixture of powders, the same applies hereinafter) at 50% in a number-based cumulative particle size distribution. Alternatively, mixing with use of, for example, a rotary blade fluidized mixer having a low pulverization action can be applied if primary particles of the starting raw materials have a powder particle size of less than or equal to 0.5 μm at 50% in a number-based cumulative particle size distribution and aggregation of secondary particles is weak. Here, the powder particle size of the mixed powder (referring to the power obtained through mixture of powders, the same applies hereinafter) at 50% in a number-based cumulative particle size distribution can be measured by calculating, with image analysis software, an equivalent circle diameter from an external observation image obtained by an SEM (scanning electron microscope).

The granulating method in granulating sub step S12 is not particularly limited, and applicable examples of the granulating method include use of known devices such as a spray drier and an extrusion granulation machine. In granulation, binder components such as a wax material may be appropriately used as a binder material. The shape and dimension of the granules are not particularly limited. The granules can be made as a circular column shape having a diameter of 0.5 mm to 5.0 mm and a length of about 5 mm to 20 mm.

In heat treatment sub step S13, when the granules are subjected to a heat treatment, oxygen (O) in the Ti-containing oxide powder and the additional element-containing oxide powder (including the cases where at least a part of the oxide powders is a complex oxide powder containing Ti and the additional element) first reacts with carbon (C) in the carbon source powder to cause a reduction reaction where the oxide powders are reduced to provide Ti and the additional element. Ti and the additional element in the oxide powders, which have been provided through the reduction, are in a state of being likely to cause a solid solution reaction where Ti and the additional element are made into a solid solution by mutual dispersion. Ti and the additional element in the oxide powders, which have been provided through the reduction, cause a carbonitriding reaction of reacting with nitrogen (N) in the nitrogen atmosphere gas and C in the carbon source powder almost at the same time as the solid solution reaction proceeds, to form complex carbonitride powder 1 that includes complex carbonitride particles 1$p$ including homogeneous composition particles that contain Ti and the additional element in homogeneous composition.

On the other hand, the use of metal powders (specifically, a Ti-containing metal powder and an additional element-containing metal powder) or carbonitride powders (specifically, a Ti-containing carbonitride powder and an additional element-containing carbonitride powder) as starting raw materials cannot give a complex carbonitride powder that includes complex carbonitride particles including many homogeneous composition particles homogeneous in composition in the particles. The reason why such a complex carbonitride powder cannot be obtained when the metal powders are used as starting raw materials is that the heat treatment causes the carbonitriding reaction earlier, so that the solid solution reaction resulting from mutual dispersion between Ti and the additional element does not proceed. The reason why such a complex carbonitride powder cannot be obtained when the carbonitride powders are used as starting raw materials is that the carbonitride powders (particularly, the Ti-containing carbonitride powder) are chemically stable even in a high temperature range exceeding 2000° C., so that the solid solution reaction resulting from mutual dispersion between Ti and the additional element does not proceed.

The atmosphere in the heat treatment of heat treatment sub step S13 is a nitrogen gas ($N_2$ gas)-containing nitrogen atmosphere gas, from the viewpoint of forming the complex carbonitride powder from the oxide powders together with the carbon source powder. The nitrogen atmosphere gas may be a pure $N_2$ gas or a mixed gas obtained by mixing a $N_2$ gas with a hydrogen gas ($H_2$ gas), an argon gas (Ar gas), a helium gas (He gas), or a carbon monoxide gas (CO gas).

A temperature in the heat treatment of heat treatment sub step S13 is greater than or equal to 1800° C., preferably greater than or equal to 2000° C., from the viewpoint of allowing the reduction reaction, the solid solution reaction, and the carbonitriding reaction of the oxide powders to proceed and promoting these reactions. In particular, the temperature needs to be greater than or equal to 1800° C. from the viewpoint of sufficiently reducing, forming a solid solution from, and carbonitriding the Ti-containing oxide powder, and the temperature is preferably greater than or equal to 2000° C. from the viewpoint of sufficiently reducing, forming a solid solution from, and carbonitriding an oxide powder containing Al, Zr, and/or Hf as the additional element. In addition, the temperature is preferably less than or equal to 2400° C. from the viewpoint of preventing excessive aggregation of fired powders.

A heat treatment time in heat treatment sub step S13 varies according to the powder particle size of the mixed powder of the oxide powders and the carbon source powder as starting raw materials at 50% in a number-based cumulative particle size distribution. For example, when the powder particle size of the mixed powder at 50% in a number-based cumulative particle size distribution is about 0.3 μm to 0.5 μm, the time is suitably about 15 minutes to 60 minutes.

Figure 6:
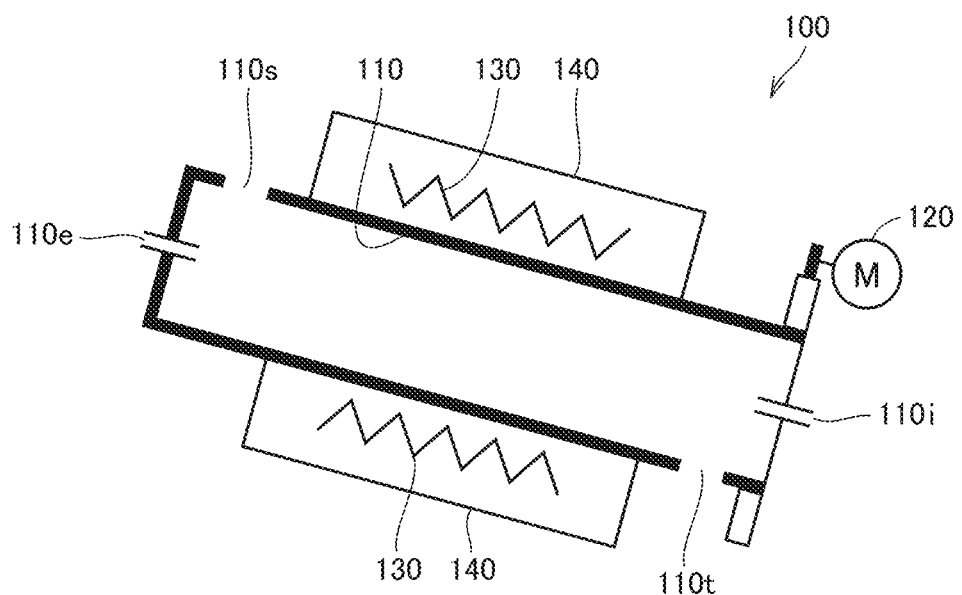
FIG. 6 is a schematic view illustrating one example of a heat treatment device used in the step of preparing a complex carbonitride powder used for manufacturing a hard alloy according to an aspect of the present invention.

Referring to FIGS. 5 and 6, in the method of manufacturing complex carbonitride powder 1 according to the present embodiment, a rotary continuous heat treatment device 100 such as a rotary kiln is used in heat treatment sub step S13. An inclined rotary reaction tube 110 is heated to greater than or equal to 1800° C., a nitrogen atmosphere gas is flown through rotary reaction tube 110, granules are continuously supplied from an upper portion of rotary reaction tube 110, and rotary reaction tube 110 is rotated, to perform a heat treatment while the granules move in rotary reaction tube 110, so that complex carbonitride powder 1 is formed and can be extracted from a lower portion of rotary reaction tube 110. Such a method of manufacturing complex carbonitride powder 1 can continuously and efficiently give stable-quality complex carbonitride powder 1 according to Embodiment 1 that includes complex carbonitride particles 1$p$ including many homogeneous composition particles 1$ph$ homogeneous in composition in the particles.

Heat treatment device 100 illustrated in FIG. 6 includes rotary reaction tube 110 that rotates around a long axis and is cylindrical; a rotary mechanism 120 for rotating rotary reaction tube 110; a heating mechanism 130 for heating rotary reaction tube 110; and a casing 140 that stores the heating mechanism. Rotary reaction tube 110 is provided with a gas inlet 110$i$ for introducing the nitrogen atmosphere gas into rotary reaction tube 110; a gas outlet 110$e$ for discharging the nitrogen atmosphere gas from rotary reaction tube 110; a raw material inlet 110$s$ for charging starting raw materials into rotary reaction tube 110; and a heat-treated product outlet 110$t$ for extracting the complex carbonitride powder as a heat treated product from rotary reaction tube 110. Rotary reaction tube 110 rotates around the long axis.

In heat treatment device 100 illustrated in FIG. 6, gas inlet 110$i$ is provided in the lower portion of rotary reaction tube 110 while gas outlet 110$e$ is provided in the upper portion of rotary reaction tube 110 to give a configuration where the nitrogen atmosphere gas passes from the lower portion toward the upper portion of rotary reaction tube 110. The configuration, however, may be the other way around so that the nitrogen atmosphere gas passes from the upper portion toward the lower portion of rotary reaction tube 110.

In heat treatment sub step S13, heat treatment device 100 illustrated in FIG. 6 operates as follows. Rotary reaction tube 110 is heated in advance to greater than or equal to 1800° C. by heating mechanism 130 of heat treatment device 100, while the nitrogen atmosphere gas is introduced into rotary reaction tube 110 from gas inlet 110i. Rotary reaction tube 110 is heated to a predetermined heat treatment temperature of greater than or equal to 1800° C., and then granules are supplied from raw material inlet 110s into rotary reaction tube 110 while rotary reaction tube 110 is rotated by rotary mechanism 120. The granules that have been supplied into rotary reaction tube 110 move from the upper portion toward the lower portion of rotary reaction tube 110 through rotary reaction tube 110 by rotation of rotary reaction tube 110 while heated to the above-mentioned heat treatment temperature by heat transferred from an inner wall of rotary reaction tube 110 and radiant heat.

In the granules that have been heated to a heat treatment temperature of greater than or equal to 1800° C. occurs a reduction reaction of the oxide powders (the Ti-containing oxide powder and the additional element-containing oxide powder (including the cases where at least a part of the oxide powders is a complex oxide powder containing Ti and the additional element) in the granules. Active Ti and additional element in the oxide powders, which have been provided through the reduction, promote formation of a solid solution by mutual dispersion between Ti and the additional element. Further, Ti and the additional element react with nitrogen (N) supplied from the gas inlet and carbon (C) in the carbon source powder in the granules, so that a carbonitriding reaction proceeds almost at the same time as the formation of a solid solution. The thus carbonitrided granules reach the lower portion of rotary reaction tube 110 and are extracted from heat-treated product outlet 110t provided in the lower portion. The extracted granules are pulverized by a known pulverizing method appropriately selected by a person skilled in the art to give a complex carbonitride powder.

Heat treatment device 100 having the configuration described above can substantially fix heat treatment conditions (heat treatment atmosphere, heat treatment temperature, and heat treatment time) for granules to continuously and efficiently manufacture a complex carbonitride powder stable in quality.

(Step of Mixing Complex Carbonitride Powder with Metal Powder)

As illustrated in FIG. 3, step S20 of mixing the complex carbonitride powder with a metal powder is not particularly limited and can be appropriately selected according to an object of a person skilled in the art. There can be applied, for example, mixing by a dry ball mill and mixing by a wet ball mill that have a high pulverization action, or mixing with use of a rotary blade fluidized mixer or the like having a low pulverization action if aggregation of the powders is weak.

(Step of Molding Mixture)

As illustrated in FIG. 3, step S30 of molding a mixture is not particularly limited; however, it is preferable to fill a mold with a mixed powder and mold the mixed powder into a predetermined shape under a predetermined pressure. Examples of the molding method include dry pressure molding, cold isostatic molding, injection molding, and extrusion molding. The pressure during the molding is preferably greater than or equal to about 0.5 ton weight/cm² (about 50 MPa) and less than or equal to about 2.0 ton weight/cm² (about 200 Mpa). A shape of a compact is appropriately selected according to the shape of a desired product so as to avoid an excessively complicated shape. The compact may be formed into a final form by appropriate machine processing required as necessary after calcining or sintering.

(Step of Sintering Compact)

As illustrated in FIG. 3, the sintering method in step S40 of sintering a compact is suitably performed by retaining the compact in a temperature range where a liquid phase occurs, for a predetermined time. A sintering temperature is, for example, greater than or equal to about 1300° C. and less than or equal to about 1600° C. An excessively high sintering temperature helps growth of particles constituting a hard phase. A retention time is greater than or equal to about 0.5 hours and less than or equal to about 2.0 hours, preferably greater than or equal to about 1.0 hour and less than or equal to about 1.5 hours, in particular. An atmosphere during heating is preferably an inert gas atmosphere of, for example, nitrogen or argon, or a vacuum (less than or equal to about 0.5 Pa).

Thus, the use of complex carbonitride powder 1 that includes complex carbonitride particles 1p including many homogeneous composition particles 1ph homogeneous in composition of Ti and the additional element in the particles, as illustrated in FIG. 4, can efficiently give hard alloy 10 according to the present embodiment that includes complex carbonitride hard phases 11 including many homogeneous composition hard phases 11h homogeneous in composition of Ti and the additional element in the phases, as illustrated in FIG. 1, and that is high both in hardness and fracture toughness.

Figure 2:
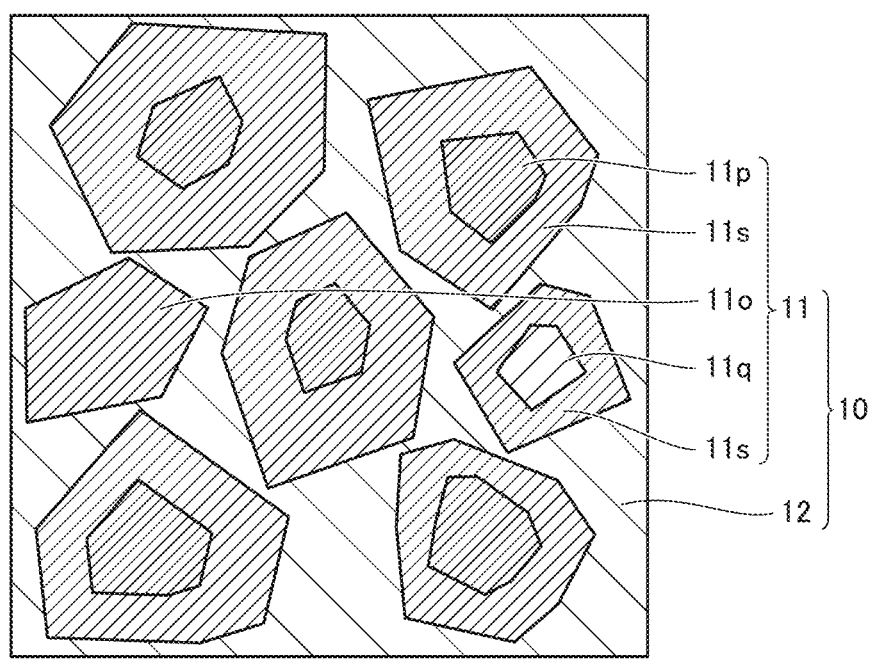
FIG. 2 is a schematic view illustrating one example of a cross-sectional structure of a conventional hard alloy.

The use of a conventional complex carbonitride powder that includes conventional complex carbonitride particles hardly including homogeneous composition particles causes a dissolution reprecipitation reaction during sintering of a compact, forming in complex carbonitride hard phases 11 many core structures that include a core phase 11p or 11q, and a peripheral phase 11s that are different from each other in composition of Ti and the additional element, as illustrated in FIG. 2, so that the hard alloy according to the present embodiment cannot be obtained that includes complex carbonitride hard phases including many homogeneous composition hard phases.

Embodiment 2: Cutting Tool

A cutting tool according to Embodiment 2 includes a base material formed of the hard alloy according to Embodiment 1. The cutting tool according to the present embodiment includes a base material formed of the hard alloy according to Embodiment 1 that is high in both hardness and fracture toughness, so that both the wear resistance and the chipping resistance are high.

The cutting tool according to the present embodiment can further include a hard film formed on at least a part of a surface of the base material. Such a cutting tool further includes the hard film, so that both the wear resistance and the chipping resistance are high.

The cutting tool according to the present embodiment can include the base material formed of the hard alloy according to Embodiment 1 and a hard film formed on at least a part of a surface of the base material by physical vapor deposition (PVD). Such a cutting tool includes the hard film formed on at least a part of the surface of the hard alloy by PVD, so that both the wear resistance and the chipping resistance are high. Here, examples of the PVD include resistive heating vapor deposition, electron beam (EB) vapor deposition, molecular beam epitaxy (MBE), ion plating, ion beam deposition, and sputtering.

The cutting tool according to the present embodiment can include the base material formed of, among the hard alloys according to the embodiments described above, the hard alloy where the content of an iron group element except cobalt (Co) in the metal binder phase is less than 1 vol %, and a hard film formed on at least a part of the surface of the base material by chemical vapor deposition (CVD). In such a cutting tool, the content of an iron group element except Co in the metal binder phase of the hard alloy that forms the base material is less than 1 vol %, that is, the content of nickel (Ni) is less than 1 vol %, so that the hard film can be formed on at least a part of the surface of the base material by CVD without forming a harmful phase that deteriorates the characteristics of the base material. Representative hard films obtained by such CVD (particularly thermal CVD), e.g., an $Al_2O_3$ film, a TiCN film, and a TiN film have the same or an approximate linear thermal expansion coefficient to that of the hard alloy, so that the generation of thermal cracking can be suppressed in such a hard film. That is, in such a cutting tool, the hard film can be formed on at least a part of the surface of the base material by chemical vapor deposition without forming a harmful phase, both the wear resistance and the chipping resistance are high, and the generation of thermal cracking can be suppressed. Here, examples of the CVD include thermal CVD, plasma CVD, and MOCVD (metal organic chemical vapor deposition).

EXAMPLES

Examples 1 to 10

Examples 1 to 10 are examples relating to the hard alloy according to Embodiment 1. As described below, hard alloys were produced by a powder metallurgy technique.

equivalent circle diameter from an external photograph obtained by an SEM. The results are shown in Table 1.

The mixed powder was formed into circular column-shaped granules having an average diameter of 2.4 mm and an average length of about 10 mm by a known extrusion granulation machine (hole diameter: ϕ2.5 mm). Here, an average diameter and an average length of the granules were measured by a micrometer.

The granules were subjected to a heat treatment by a heat treatment device 100 illustrated in FIG. 6, namely a rotary kiln in an atmosphere of a nitrogen gas as a nitrogen atmosphere gas at a heat treatment temperature shown in Table 1 to give a complex carbonitride powder. The granules passed a heating zone with a passing time of about 30 minutes. The obtained complex carbonitride powder was subjected to measurement through SEM/EDX and EPMA for a wrapped cut surface obtained by embedding complex carbonitride powder 1 in a resin, cutting the powder together with the resin, and wrapping the cut surface, to obtain a percentage of a cross-sectional area of homogeneous composition particles 1$ph$ to a cross-sectional area of complex carbonitride particles 1$p$ and a percentage of the number of homogeneous composition particles 1$ph$ to the number of complex carbonitride particles 1$p$, in the obtained complex carbonitride powder. The results are shown in Table 1.

TABLE 1

| Example | Designed composition (atom ratio) | Starting raw materials | Particle size (μm) of mixed powder at 50% in number-based cumulative particle size distribution | Heat treatment device | Heat treatment temperature (° C.) | Homogeneous composition particles Percentage of cross-sectional area (%) | Percentage of number of particles (%) |
|---|---|---|---|---|---|---|---|
| 1 | $(Ti_{0.75}W_{0.25})CN$ | Oxide powders/Graphite powder | 0.33 | Rotary kiln | 1800 | 92.1 | 92 |
| 2 | $(Ti_{0.77}Mo_{0.23})CN$ | Oxide powders/Graphite powder | 0.29 | Rotary kiln | 1800 | 93.3 | 94 |
| 3 | $(Ti_{0.85}Nb_{0.15})CN$ | Oxide powders/Graphite powder | 0.25 | Rotary kiln | 1800 | 92.7 | 92 |
| 4 | $(Ti_{0.80}Ta_{0.20})CN$ | Oxide powders/Graphite powder | 0.26 | Rotary kiln | 1800 | 94.7 | 96 |
| 5 | $(Ti_{0.95}V_{0.05})CN$ | Oxide powders/Graphite powder | 0.27 | Rotary kiln | 1800 | 93.1 | 94 |
| 6 | $(Ti_{0.95}Cr_{0.05})CN$ | Oxide powders/Graphite powder | 0.32 | Rotary kiln | 1800 | 96.6 | 96 |
| 7 | $(Ti_{0.95}Si_{0.05})CN$ | Oxide powders/Graphite powder | 0.32 | Rotary kiln | 1800 | 96.5 | 96 |
| 8 | $(Ti_{0.95}Al_{0.05})CN$ | Oxide powders/Graphite powder | 0.27 | Rotary kiln | 2000 | 93.6 | 92 |
| 9 | $(Ti_{0.90}Zr_{0.10})CN$ | Oxide powders/Graphite powder | 0.34 | Rotary kiln | 2000 | 94.7 | 96 |
| 10 | $(Ti_{0.90}Hf_{0.10})CN$ | Oxide powders/Graphite powder | 0.29 | Rotary kiln | 2200 | 93.2 | 96 |

1. Preparation Complex Carbonitride Powder

As starting raw materials, oxide powders, namely a $TiO_2$ powder and an additional element oxide ($ZrO_2$, $HfO_2$, $V_2O_5$, $Nb_2O_5$, $Ta_2O_5$, $Cr_2O_3$, $MoO_3$, $WO_3$, $Al_2O_3$, and $SiO_2$) powder and a carbon source powder, namely a graphite powder were mixed in blending ratios so as to have designed composition shown in Examples 1 to 10 of Table 1. The mixing was performed by a ball-mill method. A powder particle size of the obtained mixed powder at 50% in a number-based cumulative particle size distribution was measured by calculating, with image analysis software, an 2. Mixing of Complex Carbonitride Powder with Metal Powder The complex carbonitride powder obtained as described above was mixed with a Co powder and a Ni powder as metal powders in blending ratios so as to have designed composition shown in Examples 1 to 10 of Table 2 by a ball mill for 5 hours to give a mixture.

3. Molding of Mixture

The obtained mixture was formed into granules with camphor and ethanol and subjected to press molding at a pressure of 1 ton weight/cm$^2$ (about 98 MPa) to give a compact.

4. Sintering of Compact

Figure 7:
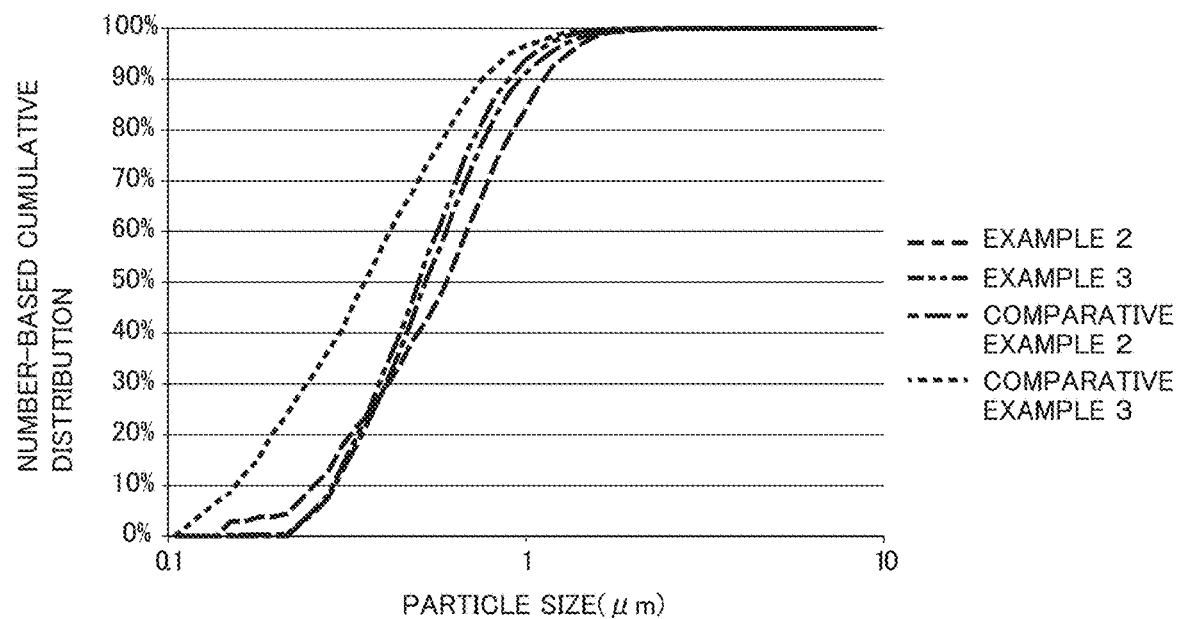
FIG. 7 is a graph of number-based cumulative crystal particle size distributions for complex carbonitride hard phases in hard alloys of Examples 2 and 3 and Comparative Examples 2 and 3.
Figure 8:
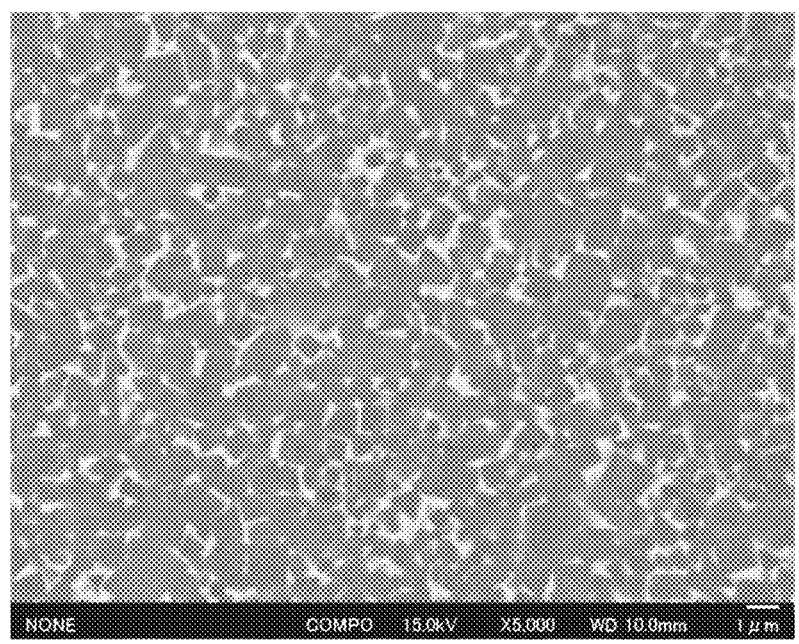
FIG. 8 is a scanning electron micrograph illustrating a cross-sectional structure of the hard alloy in Example 3.

The obtained compact was subjected to liquid phase sintering in a vacuum (0.1 Pa) atmosphere under the conditions of a maximum temperature of 1410° C. and a retention time of 1 hour to give a hard alloy as a sintered body. The obtained hard alloy was subjected to measurement through SEM/EDX (STEM (scanning transmission electron microscope)/EDX in the cases where crystals in the hard alloy had a fine particle size) and EPMA for a wrapped cut surface obtained by cutting the hard alloy and wrapping the cut surface, to obtain, on any cross section specified in the obtained hard alloy, a percentage of a cross-sectional area of homogeneous composition hard phases to a cross-sectional area of complex carbonitride hard phases and a percentage of the number of homogeneous composition hard phases to the number of complex carbonitride hard phases. The hard alloy was subjected to measurement by a Vickers indentation method for the cut surface of the hard alloy that had been mirror-finished, to obtain the hardness and the fracture toughness of the hard alloy. The hard alloy was subjected to a measurement by SEM/EBSD (electron backscatter diffraction) for the cut surface of the hard alloy that had been mirror-finished, to obtain crystal particle sizes $D_{50}$, $D_{10}$, and $D_{90}$ at 50%, 10%, and 90% in a number-based cumulative particle size distribution, and a ratio $D_{10}/D_{90}$ of the crystal particle size $D_{10}$ at 10% in a number-based cumulative particle size distribution to the crystal particle size $D_{90}$ at 90% in a number-based cumulative particle size distribution. The results are shown in Table 2. FIG. 7 illustrates the results of analyzing the hard alloys of Examples 2 and 3 in terms of the number-based cumulative crystal particle size distributions obtained by SEM/EBSD. FIG. 8 illustrates an SEM photograph of a cross-sectional structure of the hard alloy in Example 3.

As is clear from Table 2 and FIG. 8, both the hardness and the fracture toughness were high in the hard alloys that were produced with use of a complex carbonitride powder including complex carbonitride particles including many homogeneous composition particles homogeneous in composition in the particles and that included complex carbonitride hard phases including many homogeneous composition hard phases homogeneous in composition in the phases.

Figure 9:
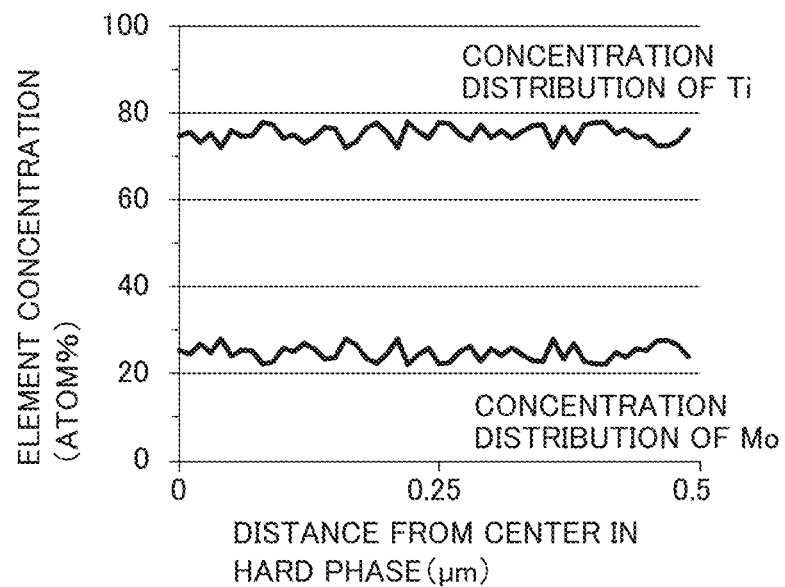
FIG. 9 is a graph illustrating concentration distributions of titanium and an additional element in a homogeneous composition hard phase of the complex carbonitride hard phases in the hard alloy of Example 2.

Next, the hard alloy of Example 2 was subjected to SEM/EDX analysis in terms of a composition distribution in a complex carbonitride hard phase. The results are shown in Table 9. The analysis was performed for a range of about 0.5 μm from the center to an end portion of a hard phase using as a target a complex carbonitride hard phase that had a relatively large particle size, a diameter of about 1.1 μm in terms of a circle having an area equivalent to that of the phase, in the hard alloy. Here, the average concentrations of Ti and Mo in all the complex carbonitride hard phases, which were obtained by SEM/EDX analysis, were 77.6 atom % and 22.2 atom %, respectively, with the balance being inevitable impurities. As is clear from FIG. 9, the complex carbonitride hard phase of the present example were so uniform to have a composition distribution of Ti within 77.6 atom %±5 atom % and a composition distribution of the additional element Mo within 22.2 atom %±5 atom %. Thus, it was understood that the hard alloy was high in both hardness and fracture toughness.

Figure 10:
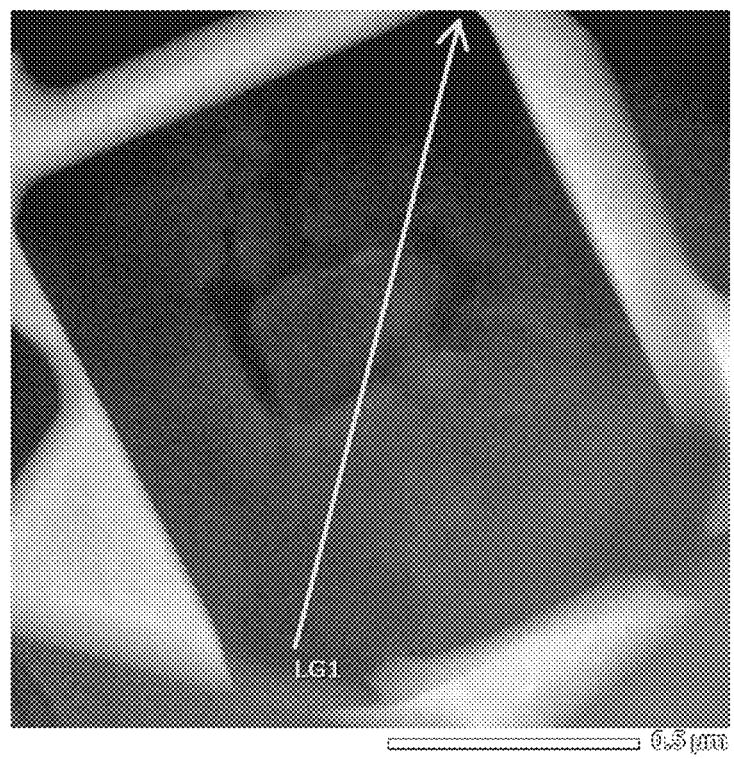
FIG. 10 is a scanning transmission electron micrograph illustrating a cross-sectional structure of the hard alloy in Example 3.
Figure 11:
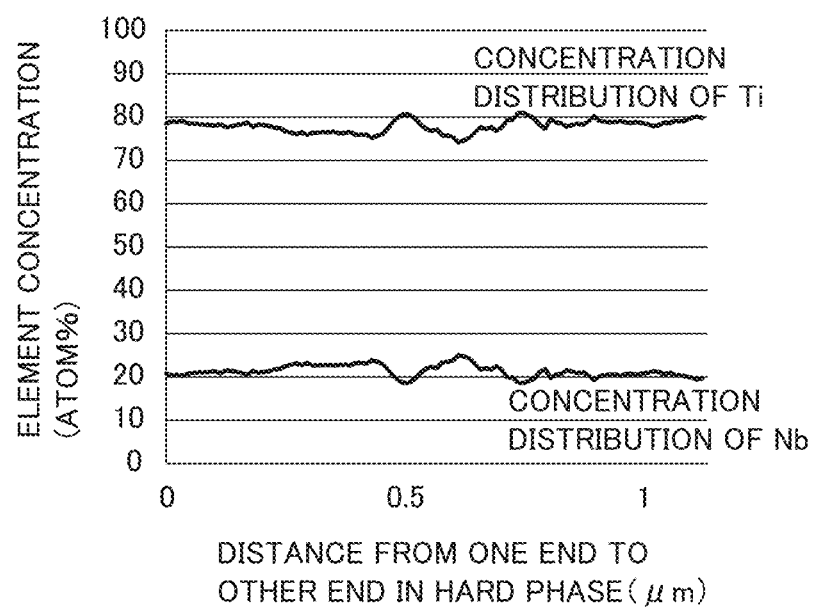
FIG. 11 is a graph illustrating concentration distributions of titanium and an additional element in a homogeneous composition hard phase of the complex carbonitride hard phases in the hard alloy of Example 3.

Further, the hard alloy of Example 3 was subjected to STEM/EDX analysis in terms of a composition distribution in a complex carbonitride hard phase. The analysis was performed for a thin film sample taken from a cross section of the hard alloy with use of FIB (focused ion beam), in a range from one end (one side end portion) indicated by an arrow to the other end (the other side end portion) on a complex carbonitride hard phase in FIG. 10. The results are shown in FIG. 11. Here, the average concentrations of Ti and Nb in all the complex carbonitride hard phases, which were obtained by STEM/EDX analysis, were 78.2 atom % and 21.2 atom %, respectively, with the balance being inevitable impurities. As is also clear from FIG. 11, the complex carbonitride hard phases of the present example were so uniform to have a composition distribution of Ti within 78.2 atom %±5 atom % and a composition distribution of the additional element Nb within 21.2 atom %±5 atom %. Thus, it was understood that the hard alloy was high in both hardness and fracture toughness.

TABLE 2

| | | Complex carbonitride hard phases | | | | | |
|---|---|---|---|---|---|---|---|
| | | Homogeneous composition phases | | Phase size $D_{50}$ (μm) at 50% in | | | |
| Example | Designed composition (vol %) | Percentage of cross-sectional area (%) | Percentage of number of particles (%) | number-based cumulative phase size distribution | Ratio $D_{10}/D_{90}$ | Hardness (GPa) | Fracture toughness (MPa · m$^{0.5}$) |
| 1 | 84(Ti$_{0.75}$W$_{0.25}$)CN—8Co—8Ni | 82.4 | 84 | 0.8 | 0.30 | 14.3 | 8.5 |
| 2 | 88(Ti$_{0.77}$Mo$_{0.23}$)CN—6Co—6Ni | 94.4 | 98 | 0.6 | 0.29 | 14.8 | 8.3 |
| 3 | 90(Ti$_{0.85}$Nb$_{0.15}$)CN—5Co—5Ni | 94.2 | 94 | 1.2 | 0.32 | 13.2 | 8.7 |
| 4 | 90(Ti$_{0.80}$Ta$_{0.20}$)CN—8Co—2Ni | 87.8 | 86 | 1.4 | 0.33 | 13.7 | 8.6 |
| 5 | 91(Ti$_{0.95}$V$_{0.05}$)CN—6Co—3Ni | 82.4 | 82 | 2.5 | 0.28 | 13.4 | 8.1 |
| 6 | 88(Ti$_{0.95}$Cr$_{0.05}$)CN—6Co—6Ni | 97.4 | 96 | 2.3 | 0.29 | 13.3 | 8.1 |
| 7 | 88(Ti$_{0.95}$Si$_{0.05}$)CN—4Co—8Ni | 82.3 | 82 | 2.6 | 0.25 | 12.9 | 8.7 |
| 8 | 88(Ti$_{0.95}$Al$_{0.05}$)CN—4Co—8Ni | 88.9 | 90 | 2.7 | 0.26 | 12.7 | 9.1 |
| 9 | 88(Ti$_{0.90}$Zr$_{0.10}$)CN—6Co—6Ni | 82.2 | 84 | 1.1 | 0.30 | 13.5 | 8.0 |
| 10 | 88(Ti$_{0.90}$Hf$_{0.10}$)CN—6Co—6Ni | 96.3 | 94 | 1.3 | 0.30 | 13.6 | 8.2 |

Comparative Examples 1 to 3

Figure 12:
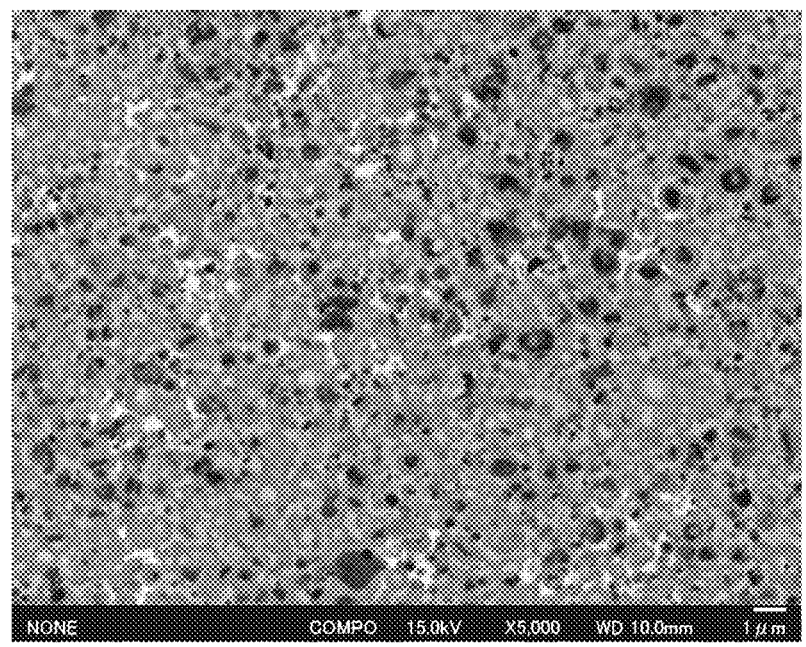
FIG. 12 is a scanning electron micrograph illustrating a cross-sectional structure of the hard alloy in Comparative Example 3.

Hard alloys of Comparative Examples 1 to 3 were obtained in the same manner as in Examples 1 to 3 by a powder metallurgy technique except for using, in place of the complex carbonitride powder, a TiCN powder having a powder particle size of 0.8 μm at 50% in a number-based cumulative particle size distribution and a WC powder having a powder particle size of 1.1 μm at 50% in a number-based cumulative particle size distribution, a Mo$_2$C powder having a powder particle size of 2.0 μm at 50% in a number-based cumulative particle size distribution, or a NbC powder having a powder particle size of 0.8 μm at 50% in a number-based cumulative particle size distribution. The obtained hard alloys were subjected to measurement in the same manner as in Example 1 to obtain, on any cross section specified in the obtained hard alloys, a percentage of a cross-sectional area of homogeneous composition hard phases to a cross-sectional area of complex carbonitride hard phases, a percentage of the number of homogeneous composition hard phases to the number of complex carbonitride hard phases, the hardness and the fracture toughness of the hard alloy, crystal particle sizes $D_{50}$, $D_{10}$, and $D_{90}$ at 50%, 10%, and 90% in a number-based cumulative particle size distribution, and a ratio $D_{10}/D_{90}$ of the crystal particle size $D_{10}$ at 10% in a number-based cumulative particle size distribution to the crystal particle size $D_{90}$ at 90% in a number-based cumulative particle size distribution. The results are shown in Table 3. FIG. 7 illustrates the results of analyzing the hard alloys of Comparative Examples 2 and 3 in terms of the number-based cumulative crystal particle size distributions obtained by SEM/EBSD. FIG. 12 illustrates an SEM photograph of a cross-sectional structure of the hard alloy in Comparative Example 3.

of the present comparative example were ununiform in composition distributions of Ti and the additional element Mo. Thus, it was understood that the hard alloy was low in fracture toughness even though the hardness was high.

Figure 14:
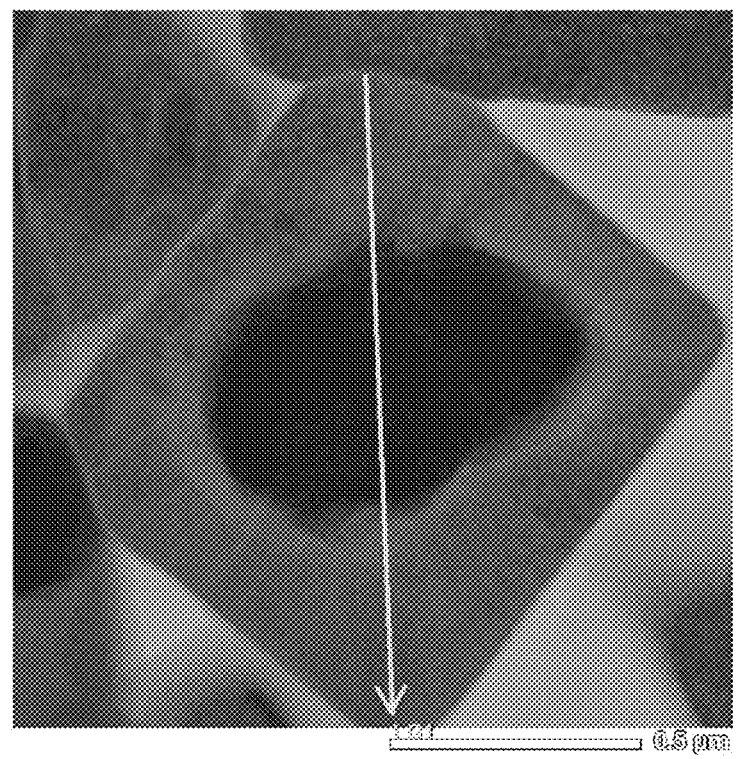
FIG. 14 is a scanning transmission electron micrograph illustrating a cross-sectional structure of the hard alloy in Comparative Example 3.
Figure 15:
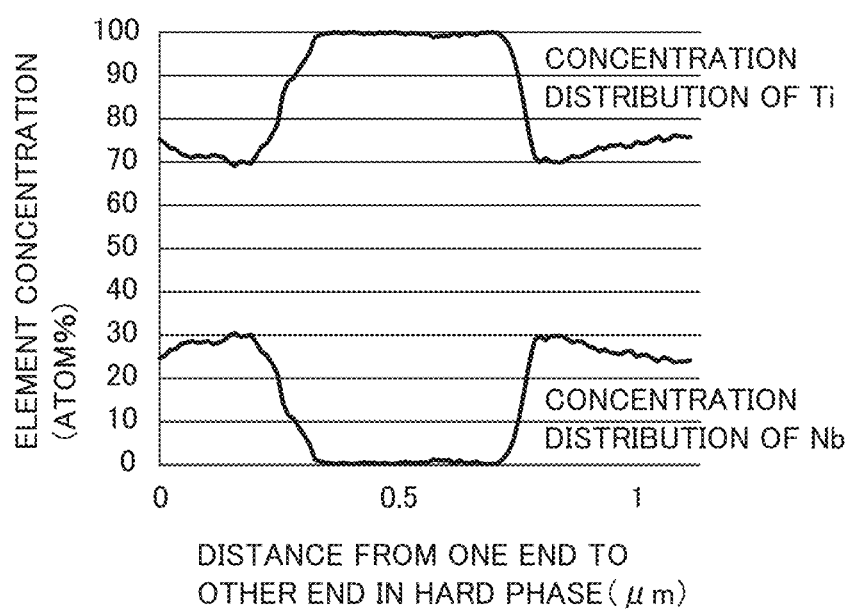
FIG. 15 is a graph illustrating concentration distributions of titanium and an additional element in a homogeneous composition hard phase of the complex carbonitride hard phases in the hard alloy of Comparative Example 3.

Further, the hard alloy of Comparative Example 3 was subjected to STEM/EDX analysis in terms of a composition distribution in a complex carbonitride hard phase. FIG. 15 shows STEM/EDX analysis results for a range from one end (one side end portion) indicated by an arrow to the other end (the other side end portion) on the complex carbonitride hard phase in FIG. 14. Here, the average concentrations of Ti and Nb in all the complex carbonitride hard phases, which were obtained by STEM/EDX analysis, were 78.6 atom % and 21.0 atom %, respectively, with the balance being inevitable impurities. As is also clear from FIG. 15, the complex carbonitride hard phases of the present comparative example were ununiform in composition distributions of Ti and the additional element Nb. Thus, it was understood that the hard alloy was low in fracture toughness even though the hardness was high.

TABLE 3

| | | Complex carbonitride hard phases | | | | | |
| | | Homogeneous composition phases | | Phase size $D_{50}$ (μm) at 50% in | | | |
| Comparative Example | Designed composition (vol %) | Percentage of cross-sectional area (%) | Percentage of number of particles (%) | number-based cumulative phase size distribution | Ratio $D_{10}/D_{90}$ | Hardness (GPa) | Fracture toughness (MPa · m$^{0.5}$) |
|---|---|---|---|---|---|---|---|
| 1 | 59.9TiCN—24.1WC—8Co—8Ni | 7.3 | 14 | 0.9 | 0.17 | 14.3 | 6.4 |
| 2 | 68.6TiCN—19.4Mo$_2$C—6Co—6Ni | 8.2 | 12 | 0.6 | 0.23 | 14.7 | 5.9 |
| 3 | 74.9TiCN—15.1NbC—5Co—5Ni | 6.0 | 22 | 0.8 | 0.21 | 14.8 | 5.1 |

As is clear from Table 3 and FIG. 12, the hard alloys produced with use of the TiCN powder and each of the additional element carbide powders that formed the complex carbonitride hard phases and the metal powders that formed a metal binder phase included complex carbonitride hard phases that hardly included homogeneous composition hard phases homogeneous in composition in the phases, and were low in fracture toughness even though the hardness was high.

Figure 13:
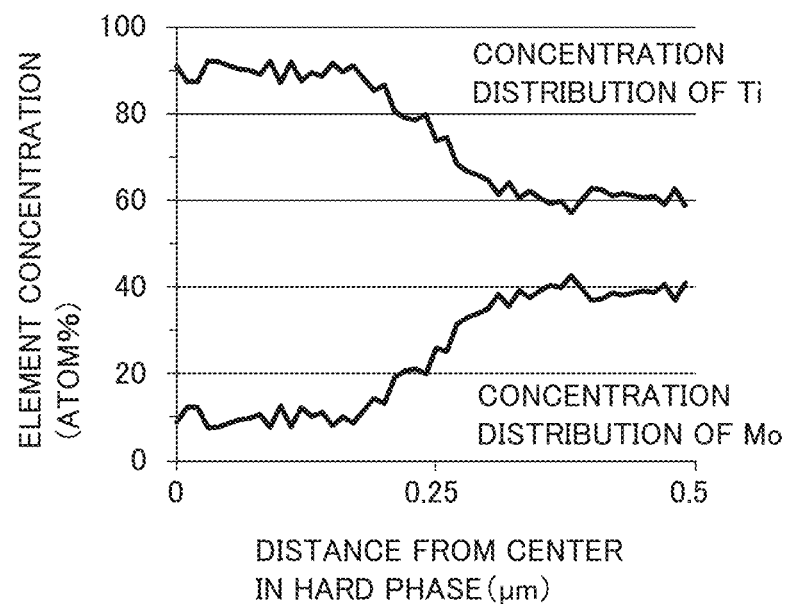
FIG. 13 is a graph illustrating concentration distributions of titanium and an additional element in a homogeneous composition hard phase of the complex carbonitride hard phases in the hard alloy of Comparative Example 2.

Next, the hard alloy of Comparative Example 2 was subjected to SEM/EDX analysis in terms of a composition distribution in a complex carbonitride hard phase. The results are shown in FIG. 13. The analysis was performed in the same manner as in Example 2 for a range of about 0.5 μm from the center to an end portion of a hard phase using as a target a complex carbonitride hard phase that had a relatively large particle size, a diameter of about 1.1 μm in terms of a circle having an area equivalent to that of the phase, in the hard alloy. Here, the average concentrations of Ti and Mo in all the hard phases, which were obtained by SEM/EDX analysis, were 77.4 atom % and 21.8 atom %, respectively, with the balance being inevitable impurities. As is clear from FIG. 13, the complex carbonitride hard phases Examples 11 to 13

Examples 11 to 13 are examples relating to the cutting tool according to Embodiment 2. As described below, cutting tools were produced.

Base materials were produced that had a CNMA120404 shape with use of the hard alloys of Examples 1 to 3. Here, the base materials were not ground for a flank face and a rake face. Then, the base materials were subjected to cutting edge processing. On a surface of each of the base materials having undergone the cutting edge processing, a TiAlN film having a thickness of 5 μm was formed as a hard film by PVD, namely sputtering. Thus, cutting tools of Examples 11 to 13 were obtained that included the base materials produced with use of the hard alloys of Examples 1 to 3, respectively.

The obtained cutting tools were subjected to a wear resistance test and a chipping resistance test that were shown in Table 4. The results are shown in Table 5.

TABLE 4

|  | Wear resistance test | Chipping resistance test |
|---|---|---|
| Target cutting material | SCM415 Round bar without grooves | SCM435 (Slot grooves, number of grooves: 4) |
| Cutting speed Vc (m/min) | 200 | 250 |
| Feeding f (mm/rev) | 0.1 | 0.25 |
| Cutting depth ap (mm) | 1.0 | 2.0 |
| Cutting state | WET | WET |
| Evaluation method | Wear amount of flank face after 15-minute cutting ($\mu$m) | Number of impacts (times of impact) with slot grooves of material to be cut until occurrence of chipping in base material |

TABLE 5

| Example | Designed composition (vol %) | Wear resistance ($\mu$m) | Chipping resistance (Number of times) |
|---|---|---|---|
| 11 | 84(Ti$_{0.75}$W$_{0.25}$)CN—8Co—8Ni | 0.117 | 4642 |
| 12 | 88(Ti$_{0.77}$Mo$_{0.23}$)CN—6Co—6Ni | 0.126 | 4987 |
| 13 | 90(Ti$_{0.85}$Nb$_{0.15}$)CN—5Co—5Ni | 0.098 | 5142 |

As is clear from Table 5, both the wear resistance and the chipping resistance were high in the cutting tools each including the base material that was produced with use of the hard alloy that included complex carbonitride hard phases including many homogeneous composition hard phases homogeneous in composition in the phases.

Comparative Examples 11 to 13

Cutting tools of Comparative Examples 11 to 13 were obtained in the same manner as in Examples 11 to 13 with use of the hard alloys of Comparative Examples 1 to 3. The obtained cutting tools were subjected to a wear resistance test and a chipping resistance test in the same manner as in Examples 11 to 13. The results are shown in Table 6.

TABLE 6

| Comparative Example | Designed composition (vol %) | Wear resistance ($\mu$m) | Chipping resistance (Number of times) |
|---|---|---|---|
| 11 | 59.9TiCN—24.1WC—8Co—8Ni | 0.122 | 3203 |
| 12 | 68.6TiCN—19.4Mo$_2$C—6Co—6Ni | 0.125 | 3022 |
| 13 | 74.9TiCN—15.1NbC—5Co—5Ni | 0.115 | 3256 |

As is clear from Table 6, the wear resistance was high while the chipping resistance was low in the cutting tools each including the base material that was produced with use of the hard alloy that included complex carbonitride hard phases hardly including homogeneous composition hard phases homogeneous in composition in the phases.

Examples 21 to 23

Examples 21 to 23 are examples relating to the hard alloy according to Embodiment 1. Mixtures obtained by mixing the same carbonitride powders of Examples 1 to 3 with a cobalt powder were subjected to press molding and liquid phase sintering under the same conditions as in Examples 1 to 3 to produce SNGN120408-shaped hard alloys. Further, the hard alloys were subjected to measurement in the same method as in Examples 1 to 3 to obtain crystal particle sizes $D_{50}$, $D_{10}$, and $D_{90}$ of complex carbonitride hard phases at 50%, 10%, and 90% in a number-based cumulative particle size distribution, a ratio $D_{10}/D_{90}$ of the crystal particle size $D_{10}$ at 10% in a number-based cumulative particle size distribution to the crystal particle size $D_{90}$ at 90% in a number-based cumulative particle size distribution. The results are shown in Table 7.

TABLE 7

| | | Complex carbonitride hard phases | | | | | |
|---|---|---|---|---|---|---|---|
| | | Homogeneous composition phases | | Phase size $D_{50}$ ($\mu$m) at 50% in number-based cumulative phase size distribution | Ratio $D_{10}/D_{90}$ | Hardness (GPa) | Fracture toughness (MPa·m$^{0.5}$) |
| Example | Designed composition (vol %) | Percentage of cross-sectional area (%) | Percentage of number of particles (%) | | | | |
| 21 | 84(Ti$_{0.75}$W$_{0.25}$)CN—16Co | 84.4 | 82 | 0.8 | 0.29 | 14.8 | 8.5 |
| 22 | 88(Ti$_{0.77}$Mo$_{0.23}$)CN—12Co | 90.8 | 92 | 0.8 | 0.26 | 15.5 | 8.3 |
| 23 | 90(Ti$_{0.85}$Nb$_{0.15}$)CN—10Co | 87.6 | 88 | 1.3 | 0.30 | 14.1 | 8.6 |

As is clear from Table 7, it is understood that both the hardness and the fracture toughness are excellent in the hard alloys of Examples 21 to 23 where the content of an iron group element other than cobalt in a metal binder phase is less than 1 vol %, specifically a main component in the metal binder phase is cobalt.

Comparative Examples 21 to 23

Hard alloys of Comparative Examples 21 to 23 were obtained in the same manner as in Examples 21 to 23 except for using, in place of the complex carbonitride powder, a TiCN powder having a particle size of 0.8 μm at 50% in a number-based cumulative particle size distribution and a WC powder having a particle size of 1.1 μm at 50% in a number-based cumulative particle size distribution, a $Mo_2C$ powder having a particle size of 2.0 μm at 50% in a number-based cumulative particle size distribution, or a NbC powder having a particle size of 0.8 μm at 50% in a number-based cumulative particle size distribution. The evaluation results of these hard alloys are shown in Table 8.

TABLE 8

| | | Complex carbonitride hard phases | | | | | |
|---|---|---|---|---|---|---|---|
| | | Homogeneous composition phases | | Phase size $D_{50}$ (μm) at 50% in | | | |
| Comparative Example | Designed composition (vol %) | Percentage of cross-sectional area (%) | Percentage of number of particles (%) | number-based cumulative phase size distribution | Ratio $D_{10}/D_{90}$ | Hardness (GPa) | Fracture toughness (MPa·$m^{0.5}$) |
| 21 | 59.9TiCN—24.1WC—16Co | 10.4 | 10 | 1.5 | 0.12 | 14.3 | 5.8 |
| 22 | 68.6TiCN—19.4$Mo_2C$—12Co | 8.0 | 8 | 1.0 | 0.23 | 14.5 | 4.9 |
| 23 | 74.9TiCN—15.1NbC—10Co | 20.8 | 16 | 1.2 | 0.16 | 14.9 | 5.1 |

As is clear from Table 8, the hard alloys that did not include the complex carbonitride powder were not excellent in both hardness and fracture toughness even though cobalt was used as the metal binder phase. It is considered that the complex carbonitride powder is excellent in sinterability with cobalt, while the carbonitride powders of Comparative Examples 21 to 23 are inferior in sinterability with cobalt, so that sintering cavities are formed in the hard alloys to deteriorate the characteristics.

Examples 31 to 33

In Examples 31 to 33, the hard alloys of Examples 21 to 23 as base materials were subjected to a known thermal CVD process to form coating of a TiC film on the base materials, thus preparing CNMA120404-shaped surface-coated cutting tools. Here, as TiC film-forming conditions, the type of a gas was a mixed gas of $TiCl_4$, $H_2$, and $CH_4$, a film forming pressure was 0.01 MPa, a film-forming temperature was 1000° C., and a film-forming time was 1 hour.

As for the film-formed cutting tools, the presence or absence of a harmful phase was confirmed for a rake face-end flat portion by XRD (X-ray diffraction). Specifically, the harmful phase was determined to be present when a clear peak derived from $Ni_3Ti$ and/or NiTi was detected by XRD, and the harmful phase was determined to be absent when peak strength derived from $Ni_3Ti$ and NiTi was less than or equal to a background level.

Then, the cutting tools were cut in such a manner that the cut portion included the rake face, the cut surface was mirror-finished, and the number of cracks included in the surface coating was measured by an SEM. The measurement was performed in a coating length of 500 μm on the cut surface. These results are shown in Table 9.

TABLE 9

| Example | Base material | Presence or absence of harmful phase | Number of cracks (crack(s)) |
|---|---|---|---|
| 31 | Example 21 | Absent | 1 |
| 32 | Example 22 | Absent | 1 |
| 33 | Example 23 | Absent | 0 |

As is clear from Table 9, the cutting tools of Examples 31 to 33 had no harmful phase formed in the coating of the TiC film, and the number of cracks were very small. Therefore, the cutting tools can be expected to be cutting tools excellent in both wear resistance and chipping resistance.

Reference Examples 31 to 34

Surface-coated cutting tools of Reference Examples 31 to 34 were produced in the same manner as in Examples 31 to 33 except for using, as the base materials, the hard alloys of Examples 1 to 3 (hard alloys including nickel in the metal binder phase) and an ultra hard alloy formed of 84 vol % WC and 16 vol % Co. As for these cutting tools of reference examples, evaluation was performed for the harmful phase and the number of cracks in the same manner as in Examples 31 to 33. The results are shown in Table 10.

TABLE 10

| Reference Example | Base material (vol %) | Presence or absence of harmful phase | Number of cracks (crack(s)) |
|---|---|---|---|
| 31 | Example 1 | Present | 0 |
| 32 | Example 2 | Present | 0 |
| 33 | Example 3 | Present | 1 |
| 34 | 84WC—16Co | Absent | 8 |

As is clear from Table 10, in the cutting tools of Reference Examples 31 to 33 including Ni in the metal binder phase, the number of cracks in the surface coating was small, while a harmful phase was formed. Therefore, the cutting tools cannot be expected to be used as cutting tools. In the cutting tool of Reference Example 34 including the ultra hard alloy as the base material, although a harmful phase was not detected, many cracks were formed. Therefore, the hard coating is fractured early depending on a cutting condition, so that the cutting tool cannot be expected to be excellent in both wear resistance and chipping resistance.

The embodiments and the examples that have been disclosed this time should be considered in all aspects as exemplary but not as limiting. The scope of the present invention is defined by the claims, rather than the embodiments described above, and is intended to include any modifications within the scope and meaning equivalent to the claims.

REFERENCE SIGNS LIST

1 Complex carbonitride powder, 1*p* Complex carbonitride particle, 1*ph* Homogeneous composition particle, 10 Hard alloy, 11 Complex carbonitride hard phase, 11*h* Homogeneous composition hard phase, 11*o* Single phase, 11*p*, 11*q* Core phase, 11*s* Peripheral phase, 12 Metal binder phase, 100 Heat treatment device, 110 Rotary reaction tube, 110*e* Gas outlet, 110*i* Gas inlet, 110*s* Raw material inlet, 110*t* Heat-treated product outlet, 120 Rotary mechanism, 130 Heating mechanism, 140 Casing, S10 Step of preparing complex carbonitride powder, S11 Mixing sub step, S12 Granulating sub step, S13 Heat treatment sub step, S20 Step of mixing complex carbonitride powder with metal powder, S30 Step of molding mixture, S40 Step of sintering molded product.

The invention claimed is:

1. A hard alloy comprising:
a plurality of complex carbonitride hard phases that contain titanium as a main component element and at least one additional element selected from the group consisting of zirconium, hafnium, vanadium, niobium, tantalum, chromium, molybdenum, tungsten, aluminum, and silicon, and a metal binder phase containing an iron group element as a main component element,
an average concentration of titanium being greater than 50 atom % relative to a total of titanium and said at least one additional element,
an average concentration of said iron group element being greater than or equal to 90 atom % relative to said metal binder phase,
said plurality of complex carbonitride hard phases including a plurality of homogeneous composition hard phases where in-complex carbonitride hard phase average concentrations of titanium and said additional element have a difference in a range of greater than or equal to −5 atom % and less than or equal to 5 atom % from average concentrations of titanium and said additional element in all said complex carbonitride hard phases, and
on any specified cross section, a cross-sectional area of said homogeneous composition hard phases accounting for greater than or equal to 80% of a cross-sectional area of said complex carbonitride hard phases, and said homogeneous composition hard phases accounting for greater than or equal to 80% of said complex carbonitride hard phases in number.

2. The hard alloy according to claim 1, wherein in said homogeneous composition hard phases, concentration distributions of titanium and said additional element in each of said homogeneous composition hard phases are in a range of greater than or equal to −5 atom % and less than or equal to 5 atom % from the average concentrations of titanium and said additional element in all said complex carbonitride hard phases.

3. The hard alloy according to claim 1, wherein on said any specified cross section, the cross-sectional area of said complex carbonitride hard phases accounts for greater than or equal to 80% and less than or equal to 97% of a cross-sectional area of said hard alloy.

4. The hard alloy according to claim 1, wherein on said any specified cross section, a crystal particle size $D_{50}$ of said complex carbonitride hard phases at 50% in a number-based cumulative particle size distribution is greater than or equal to 0.5 μm and less than or equal to 3.0 μm.

5. The hard alloy according to claim 1, wherein on said any specified cross section, a ratio $D_{10}/D_{90}$ of a crystal particle size $D_{10}$ to a crystal particle size $D_{90}$ of said complex carbonitride hard phases at 10% and 90% in a number-based cumulative particle size distribution is greater than or equal to 0.25.

6. The hard alloy according to claim 1, wherein a content of an iron group element except cobalt in said metal binder phase is less than 1 vol %.

7. A hard alloy comprising:
a plurality of complex carbonitride hard phases that containing titanium as a main component element and at least one additional element selected from the group consisting of zirconium, hafnium, vanadium, niobium, tantalum, chromium, molybdenum, tungsten, aluminum, and silicon, and a metal binder phase containing an iron group element as a main component element,
an average concentration of titanium being greater than 50 atom % relative to a total of titanium and said at least one additional element,
an average concentration of said iron group element being greater than or equal to 90 atom % relative to said metal binder phase,
said plurality of complex carbonitride hard phases including a plurality of homogeneous composition hard phases where in-complex carbonitride hard phase average concentrations of titanium and said additional element have a difference in a range of greater than or equal to −5 atom % and less than or equal to 5 atom % from average concentrations of titanium and said additional element in all said complex carbonitride hard phases,
in said homogeneous composition hard phases, concentration distributions of titanium and said additional element in each of said homogeneous composition hard phases being in a range of greater than or equal to −5 atom % and less than or equal to 5 atom % from the average concentrations of titanium and said additional element in all said complex carbonitride hard phases,
on any specified cross section, a cross-sectional area of said homogeneous composition hard phases accounting for greater than or equal to 80% of a cross-sectional area of said complex carbonitride hard phase, and said homogeneous composition hard phases accounting for greater than or equal to 80% of said complex carbonitride hard phases in number,
on said any specified cross section, the cross-sectional area of said complex carbonitride hard phases accounting for greater than or equal to 80% and less than or equal to 97% of a cross-sectional area of said hard alloy,
on said any specified cross section, a crystal particle size $D_{50}$ of said complex carbonitride hard phases at 50% in a number-based cumulative particle size distribution being greater than or equal to 0.5 μm and less than or equal to 3.0 μm,
on said any specified cross section, a ratio $D_{10}/D_{90}$ of a crystal particle size $D_{10}$ to a crystal particle size $D_{90}$ of said complex carbonitride hard phases at 10% and 90% in a number-based cumulative particle size distribution being greater than or equal to 0.25, and
a content of an iron group element except cobalt in said metal binder phase being less than 1 vol %.

8. A cutting tool comprising a base material formed of the hard alloy according to claim 1.

9. The cutting tool according to claim 8, further comprising a hard film that is formed on at least a part of a surface of said base material.

10. A cutting tool comprising a base material formed of the hard alloy according to claim 1, and a hard film that is formed on at least a part of a surface of said base material by physical vapor deposition.

11. A cutting tool comprising a base material formed of the hard alloy according to claim 6, and a hard film that is formed on at least a part of a surface of said base material by chemical vapor deposition.

* * * * *